United States Patent
Baskaran et al.

(10) Patent No.: US 12,486,344 B2
(45) Date of Patent: Dec. 2, 2025

(54) NON-THIOL NITROGEN BASED HYDROPHOBIC POLYMER BRUSH MATERIALS AND USE THEREOF FOR MODIFICATION OF SUBSTRATE SURFACES

(71) Applicant: Merck Patent GmbH, Darmstadt (DE)

(72) Inventors: Durairaj Baskaran, Bridgewater, NJ (US); Md S. Rahman, Flemington, NJ (US); Sachin Bobade, Somerville, NJ (US)

(73) Assignee: Merck Patent GmbH, Darmstadt (DE)

( * ) Notice: Subject to any disclaimer, the term of this patent is extended or adjusted under 35 U.S.C. 154(b) by 645 days.

(21) Appl. No.: 17/762,604

(22) PCT Filed: Nov. 24, 2020

(86) PCT No.: PCT/EP2020/083135
§ 371 (c)(1),
(2) Date: Mar. 22, 2022

(87) PCT Pub. No.: WO2021/105086
PCT Pub. Date: Jun. 3, 2021

(65) Prior Publication Data
US 2022/0389135 A1  Dec. 8, 2022

Related U.S. Application Data

(60) Provisional application No. 62/940,378, filed on Nov. 26, 2019.

(51) Int. Cl.
C09D 133/10 (2006.01)
C08F 112/08 (2006.01)
C08F 120/14 (2006.01)
C09D 125/06 (2006.01)

(52) U.S. Cl.
CPC .......... *C08F 120/14* (2013.01); *C08F 112/08* (2013.01); *C09D 125/06* (2013.01); *C09D 133/10* (2013.01)

(58) Field of Classification Search
CPC ........ C08F 120/14; C08F 112/08; C08F 8/30; C08F 212/08; C08F 220/14; C08F 297/026; C08F 8/32; C08F 212/18; C08F 220/34; C09D 125/06; C09D 133/10; C09D 125/18; C09D 133/14; C09D 153/00; G03F 7/0002
USPC ....................................................... 524/560
See application file for complete search history.

(56) References Cited

U.S. PATENT DOCUMENTS

| | | |
|---|---|---|
| 3,837,859 A | 9/1974 | Tsuji et al. |
| 4,104,455 A | 8/1978 | Nagasawa |
| 4,451,551 A | 5/1984 | Kataoka et al. |
| 4,830,953 A | 5/1989 | Bateman |
| 5,821,456 A | 10/1998 | Wille et al. |
| 2008/0220365 A1 | 9/2008 | Munnelly et al. |
| 2009/0093601 A1* | 4/2009 | Evans ............... C08F 220/1804 526/204 |
| 2013/0078570 A1 | 3/2013 | Hieno et al. |
| 2014/0131839 A1* | 5/2014 | Chan ..................... B82Y 40/00 257/618 |
| 2014/0234589 A1 | 8/2014 | Koh et al. |
| 2015/0329718 A1 | 11/2015 | Choi et al. |
| 2016/0251508 A1 | 9/2016 | Hustad et al. |
| 2016/0251538 A1 | 9/2016 | Hustad et al. |
| 2016/0251539 A1 | 9/2016 | Hustad et al. |
| 2016/0254141 A1 | 9/2016 | Justad et al. |
| 2017/0022300 A1 | 1/2017 | Hirahara |
| 2017/0114246 A1 | 4/2017 | Arellano et al. |
| 2018/0254189 A1 | 9/2018 | Xu |
| 2019/0235386 A1 | 8/2019 | Komatsu et al. |

FOREIGN PATENT DOCUMENTS

| | | |
|---|---|---|
| CN | 101775088 A | 7/2010 |
| CN | 101851306 A | 10/2010 |
| CN | 105849636 A | 8/2016 |

(Continued)

OTHER PUBLICATIONS

Opsteen et al., "Modular synthesis of ABC type block copolymers by "click" chemistry", Journal of Polymer Science, Part A: Polymer Chemistry, vol. 45, No. 14, 2007, pp. 2913-2924.

International Search Report and Written Opinion received for PCT Application No. PCT/EP2020/083135, mailed on Feb. 25, 2021, 17 Pages.

Rao et al., "2-D gold nanoparticle arrays from thermally directed self-assembly of peptide-derivatized block copolymers", Soft Matter, vol. 9, No. 33, 2013, pp. 8023-8032.

Reichenwallner et al., "Tunable dynamic hydrophobic attachment of guest molecules in amphiphilic core-shell polymers", Polymer Chemistry, vol. 7, No. 37, 2016, pp. 5783-5798.

Rydzek et al., "Electronically Triggered Assembly of Films: A One-Pot Morphogen-Driven Buildup", Angewandte Chemie, International Edition, vol. 50, No. 19, 2011, pp. 4374-4377.

(Continued)

*Primary Examiner* — Hannah J Pak
(74) *Attorney, Agent, or Firm* — EMD Performance Materials Corp.

(57) ABSTRACT

One aspect of this invention is a novel functional polymer having a polydispersity from 1 to about 1.12 comprising at least one reactive moiety, selected from a moiety comprising at least one N-coordinative functional group having at least one lone pair of electrons, a moiety comprising a dialkylsilyl group, or a mixture of both groups, wherein said reactive moiety is present in said functional styrenic polymer either on a repeat unit, on an end group or on both, and said N-coordinative functional group is either a monodentate N-coordinative functional group, a polydendate N-coordinative group or a mixture of thereof, and said monodentate N-coordinative functional group is an azide moiety (—$N_3$) or a cyano moiety (—CN). Another aspect of this invention is the use of these novel polymer to selectively deposit a DSA directing layer on a metallic substrate.

19 Claims, 1 Drawing Sheet

(56) References Cited

FOREIGN PATENT DOCUMENTS

| | | |
|---|---|---|
| CN | 106947107 A | 7/2017 |
| EP | 0141781 A2 | 5/1985 |
| EP | 0195256 A2 | 9/1986 |
| EP | 0628879 A1 | 12/1994 |
| EP | 0642057 A1 | 3/1995 |
| JP | S51129475 U | 10/1976 |
| JP | S56-57826 A | 5/1981 |
| JP | S61-254944 A | 11/1986 |
| JP | 2018-005203 A | 1/2018 |
| KR | 10-0938565 B1 | 1/2010 |
| WO | 95/21030 A1 | 8/1995 |
| WO | 96/31805 A1 | 10/1996 |
| WO | 02/082180 A1 | 10/2002 |
| WO | 2005/022968 A1 | 3/2005 |
| WO | 2005/049548 A1 | 6/2005 |
| WO | 2008/156552 A1 | 12/2008 |
| WO | 2009/091508 A1 | 7/2009 |
| WO | 2011/116217 A1 | 9/2011 |
| WO | 2014/195271 A1 | 12/2014 |
| WO | 2015/091047 A1 | 6/2015 |
| WO | 2015093611 A1 | 6/2015 |
| WO | 2016/102157 A1 | 6/2016 |
| WO | 2016/132248 A1 | 8/2016 |
| WO | 2021/105086 A1 | 6/2021 |

OTHER PUBLICATIONS

Shi et al., "Ligand-Directed Assembly of Azide-Bridged Tetranuclear, One-Dimensional and Two-Dimensional Cu(II) Complexes: Synthesis, Crystal Structure and Magnetic Properties", American Chemical Society, Crystal Growth & Design, vol. 12, No. 7, May 24, 2012, pp. 3436-3443.

Someya et al., "Synthesis and Characterization of Si-containing Block Co-polymers with Resolution beyond 10 nm", Journal of Photopolymer Science and Technology, vol. 29, No. 5, 2016, pp. 701-704.

Song et al., "Monodisperse PS-b-PMMA copolymers by click chemistry: A mild dehydrobromination of the PMMA end via tetra-n-butylammonium fluoride", Macromolecular Research, vol. 20, No. 10, 2012, pp. 1037-1043.

Tang et al., "Synthesis and morphology of ABC triblock copolymers containing styrene and 4-vinylpyridine", Abstracts of Papers, 233rd ACS National Meeting, Chicago, IL, United States, PMSE-192, 2007, 1 Page.

Tasdelen et al., "Orthogonal Synthesis of Block Copolymer via Photoinduced CuAAC and Ketene Chemistries", Macromolecular rapid communications, vol. 37, No. 6, 2016, pp. 521-526.

Toulemon et al., "Fast Assembling of Magnetic Iron Oxide Nanoparticles by Microwave-Assisted Copper(I) Catalyzed Alkyne-Azide Cycloaddition (CuAAC)", American Chemical Society, Chemistry of Materials, vol. 25, No. 14, 2013, pp. 2849-2854.

Vandenbergh et al., "Polymer end group modifications and polymer conjugations via "click" chemistry employing microreactor technology", Journal of Polymer Science, Part A: Polymer Chemistry, vol. 52, No. 9, 2014, pp. 1263-1274.

Van-Dongen et al., "A block copolymer for functionalisation of polymersome surfaces", Macromolecular Rapid Communications, vol. 29, No. 4, 2008, pp. 321-325.

Vogt et al., "An Efficient Route to Macromonomers via ATRP and Click Chemistry", Macromolecules, vol. 39, No. 16, 2006, pp. 5286-5292.

Wang et al., "Studies on carbon nanotube surface modified with polystyrene", Gaodeng Xuexiao Huaxue Xuebao, vol. 27, No. 6, 2006, pp. 1157-1161 (English Abstract Included).

Wiltshire et al., "Degradable star polymers with high "click" functionality", Journal of Polymer Science, Part A: Polymer Chemistry, vol. 47, No. 6, 2009, pp. 1485-1498.

Wu et al., "Synthesis of Polystyrene and Poly (4-vinylpyridine) Mixed Grafted Silica Nanoparticles via a Combination of ATRP and CuI-Catalyzed Azide-Alkyne Click Chemistry", Macromolecular Rapid Communications, vol. 38, No. 1, 2017, 7 Pages.

Xiong, "Non-isothermal crystallization kinetics of syndiotactic polystyrene-polystyrene functionalized SWNTs Nanocomposites", Express Polymer Letters, vol. 1, No. 7, 2007, pp. 416-426.

Yamamoto et al., "Synthesis of Amphiphilic Diblock Copolymer Using Heterobifunctional Linkers, Connected by a Photodegradable N-(2-Nitrobenzyl) imide Structure and Available for Two Different Click Chemistries", Bulletin of the Chemical Society of Japan, vol. 89, No. 4, 2016, pp. 481-489.

Yamazaki et al., "Three-arm star block copolymers of aromatic polyether and polystyrene from chain-growth condensation polymerization, atom transfer radical polymerization, and click reaction", Journal of Polymer Science Part A: Polymer Chemistry, vol. 50, No. 17, 2012, pp. 3648-3655.

Yue et al., "Anionic synthesis of a "clickable" middle-chain azidefunctionalized polystyrene and its application in shape amphiphiles", Chinese Journal of Polymer Science, vol. 31, No. 1, 2013, pp. 71-82.

Zeng et al., "Metal-ions directed self-assembly of hybrid diblock copolymers", Journal of Materials Research, vol. 29, No. 22, 2014, pp. 2694-2706.

Zhang et al., "A "Click Chemistry" Approach to Linear and Star-Shaped Telechelic POSS-Containing Hybrid Polymers.", Macromolecules, vol. 43, No. 7, 2010, pp. 3148-3152.

Zhang, Wen-Bin, "Soft fullerene materials: Click chemistry and supramolecular assemblies", American Chemical Society, Polymer Preprints, vol. 51, No. 1, 2010, p. 59.

Office Action received for Chinese Patent Application No. 202080078102.9 mailing date Sep. 8, 2023, 16 Pages (8 Pages of English translation and 8 Pages of official copy).

Albrecht et al., "Bit-patterned magnetic recording: Theory, media fabrication, and recording performance", IEEE Transactions on Magnetics, vol. 51, No. 5, Feb. 2, 2015, pp. 1-42.

Andren et al., "Therapeutic Nanocarriers via Cholesterol Directed Self-Assembly of Well-Defined Linear-Dendritic Polymeric Amphiphiles", Chemistry of Materials, vol. 29, No. 9, 2017, pp. 3891-3898.

Aridi et al., "Synthesis of arborescent polymers by "click" grafting", MRS Online Proceedings Library , vol. 1613, 2014, 9 Pages.

Baker et al., "Mechanochemical synthesis of polymer-tethered fullerenes", Abstracts of Papers, 245th ACS National Meeting & Exposition, New Orleans, LA, United States, 2013, 1 Page (Abstract Submitted Only).

Biswas et al., "Polymer-Assisted Chain-like Organization of CuNi Alloy Nanoparticles: Solvent-Adoptable Pseudohomogeneous Catalysts for Alkyne-Azide Click Reactions with Magnetic Recyclability, American Chemical Society", Journal of Physical Chemistry C, vol. 118, No. 38, 2014, pp. 22156-22165.

Brady et al., "A Strategy for Preparing Star Polymers Containing Metal-Metal Bonds Along the Polymeric Arms Using Click Chemistry", Journal of Inorganic and Organometallic Polymers and Materials, vol. 23, No. 1, 2012, pp. 158-166.

Brady et al., "Preparation of Polymers Containing Metal-Metal Bonds along the Backbone Using Click Chemistry", Journal of Inorganic and Organometallic Polymers and Materials, vol. 20, No. 3, 2010, pp. 511-518.

Capacchione et al., "Syndiotactic Polystyrene-block-Poly(methyl methacrylate) Copolymer via Click Chemistry", Macromolecular Chemistry and Physics, vol. 214, No. 17, 2013, pp. 1990-1997.

Coessens et al., "End group transformation of polymers prepared by ATRP, substitution to azides", Journal of Macromolecular Science, Pure and Applied Chemistry, vol. A36, No.(5 & 6), 2006, pp. 667-679.

Cummins et al., "Area selective polymer brush deposition", Macromolecular Rapid Communications, vol. 38, 2017, 6 Pages.

Darcos et al., "Synthesis of PCL-graft-PS by combination of ROP, ATRP, and click chemistry", European Polymer Journal, vol. 47, No. 2, 2011, pp. 187-195.

Dedeoglu et al., "Synthesis of tadpole polymers via triple click reactions: Copper-catalyzed azide-alkyne cycloaddition, dielsalder,

(56) References Cited

OTHER PUBLICATIONS and nitroxide radical coupling reactions", Journal of Polymer Science, Part A: Polymer Chemistry, vol. 50, No. 10, 2012, pp. 1917-1925.

Degirmenci et al., "Synthesis of poly(cyclohexene oxide)-block-polystyrene by combination of radical-promoted cationic polymerization, atom transfer radical polymerization and click chemistry", Polymer International, vol. 59, No. 6, 2010, pp. 859-866.

Demirci et al., "Synthesis and characterization of graft copolymers by photoinduced CuAAC click chemistry", European Polymer Journal, vol. 66, 2015, pp. 282-289.

Dong et al., "Effects of molecular geometry on the self-assembly of giant polymer-dendron conjugates in condensed state", Soft Matter, vol. 10, No. 18, 2014, pp. 3200-3208.

Dong et al., "Synthesis of Hyperbranched Poly(phenylacetylene)s Containing Pendant Alkyne Groups by One-Pot Pd-Catalyzed Copolymerization of Phenylacetylene with Diynes", Macromolecules, vol. 45, No. 12, 2012, pp. 5020-5031.

Fang et al., "Anion-directed assembly of helical copper(II) complexes based on a bispyridylpyrrole ligand: synthesis, structural and magnetic properties", Royal Society of Chemistry Advances, vol. 5, No. 12, 2015, pp. 8996-9001.

Feng et al., "Well-defined graft copolymers: from controlled synthesis to multipurpose applications", Chemical Society Reviews, vol. 40, No. 3, 2011, pp. 1282-1295.

Frankamp et al., "Recognition-Mediated Assembly of Nanoparticles into Micellar Structures with Diblock Copolymers", Journal of the American Chemical Society, vol. 124, No. 6, 2002, pp. 892-893.

Gao et al., "Synthesis of Star Polymers by a Combination of ATRP and the "click" Coupling Method", Macromolecules, vol. 39, No. 15, Jun. 21, 2006, pp. 4960-4965.

Guillaneuf et al., "Radical Chain End Chemical Transformation of SG1-Based Polystyrenes", Macromolecules, vol. 43, No. 1, 2010, pp. 91-100.

Gunay et al., "V-shaped graft copolymers via triple click reactions: Diels-Alder copper-catalyzed azide-alkyne cycloaddition, and nitroxide radical coupling", Journal of Polymer Science, Part A: Polymer Chemistry, vol. 51, No. 21, 2013, pp. 4667-4674.

Hufnagel et al., "Donor-acceptor block copolymers carrying pendant PC71BM fullerenes with an ordered nanoscale morphology", Polymer Chemistry, vol. 6, No. 5, 2015, pp. 813-826.

Jeffries-El et al., "Synthesis of nanostructured regioregular poly(3-hexylthiophene) block copolymers via "click" chemistry", Polymer Preprints (American Chemical Society, Division of Polymer Chemistry), vol. 49, No. 2, 2008, pp. 654-655.

Ji et al., "Hierarchical honeycomb-structured films by directed self-assembly in "breath figure" templating of ionizable "clicked" PH3T-b-PMMA diblock copolymers: an ionic group/counter-ion effect on porous polymer film morphology", Chemical Communications, vol. 53, No. 11, 2017, pp. 1876-1879.

Jing et al., "One-Pot Synthesis of PS-b-PEO-b-PtBA Triblock Copolymers via Combination of SET-LRP and "Click" Chemistry Using Copper(0)/PMDETA as Catalyst System", Macromolecules, vol. 44, No. 4, 2011, pp. 805-810.

Kardelis et al., "Click Functionalization of a Dibenzocyclooctyne-Containing Conjugated Polyimine", Angewandte Chemie (International ed. in English), vol. 55, No. 3, 2016, pp. 945-949.

Kong et al., "Synthesis and characterization of hyperbranched polystyrene via click reaction of AB2 macromonomer", Journal of Polymer Science, Part A: Polymer Chemistry, vol. 48, No. 2, 2010, pp. 454-462.

Kulikov et al., "Self-assembling morphologies obtained from helical polycarbodiimide copolymers and their triazole derivatives", Journal of Visualized Experiments, vol. 120, 2017, pp. 1-9.

Kulis et al., "Rapid, Selective, and Reversible Nitroxide Radical Coupling (NRC) Reactions at Ambient Temperature", Macromolecules, vol. 42, No. 21, 2009, pp. 8218-8227.

Li et al., "Binary Polymer Brushes on Silica@Polymer Hybrid Nanospheres and Hollow Polymer Nanospheres by Combined Alkyne-Azide and Thiol-Ene Surface Click Reactions", Macromolecules, vol. 43, No. 24, 2010, pp. 10275-10282.

Li et al., "Effect of Stereochemistry on Directed Self-Assembly of Poly(styrene-b-lactide) Films on Chemical Patterns", ACS Macro Letters, vol. 5, No. 3, 2016, pp. 396-401.

Li et al., "Functionalization of single-walled carbon nanotubes with well-defined polystyrene by "click" coupling", Journal of the American Chemical Society, vol. 127, No. 41, Sep. 23, 2005, pp. 14518-14524.

Li et al., "Synthesis of C60 end-capped polymers from azide functional polystyrene via atom transfer radical Polymerization", Journal of Polymer Science, Part A: Polymer Chemistry, vol. 38, No. 24, 2000, pp. 4519-4523.

Li et al., "Water-soluble SWCNTs from sulfonation of nanotube-bound polystyrene", Carbon vol. 45, No. 5, 2007, pp. 984-990.

Lim et al., ""Click" synthesis of thermally stable au nanoparticles with highly grafted polymer shell and control of their behavior in polymer matrix", Journal of Polymer Science Part A: Polymer Chemistry, vol. 49, No. 16, 2011, pp. 3464-3474.

Liu et al., "Halide-ion directed assembly of distinct CdII coordination polymers with 3, 5-bis (4-pyridyl)-4-(3-pyridyl)-1,2, 4-triazole and azide", Inorganic Chemistry Communications, vol. 59, 2015, pp. 9-12.

Liu et al., "Synthesis of well-defined macromonomers by the combination of atom transfer radical polymerization and a click reaction", Journal of Polymer Science, Part A: Polymer Chemistry, vol. 44, No. 20, 2006, pp. 6103-6113.

Luo et al., "Efficient synthesis and self-assembly of hetero-grafted amphiphilic polypepide bottlebrushes", Pure and Applied Chemistry, vol. 84, No. 12, 2012, pp. 2569-2578.

Luo et al., "Improved self-assembly of poly (dimethylsiloxane-b-ethylene oxide) using a hydrogen-bonding additive", Journal of Polymer Science Part A: Polymer Chemistry, vol. 54, No. 14, 2016, pp. 2200-2208.

Lutz et al., "Combining atom transfer radical polymerization and click chemistry: A versatile method for the preparation of end-functional polymers", Macromolecular Rapid Communications, vol. 26, No. 7, 2005, pp. 514-518.

Macleod et al., "Block co-polyMOFs: assembly of polymer-polyMOF hybrids via iterative exponential growth and "click" chemistry", Polymer Chemistry, vol. 8, No. 31, 2017, pp. 4488-4493.

Maher et al., "Directed Self-Assembly of Silicon-Containing Block Copolymer Thin Films", ACS Applied Materials & Interfaces, vol. 7, No. 5, 2015, pp. 3323-3328.

Mayo, "Phase separation of polymer-functionalized SWNTs within a PMMA/polystyrene blend", Journal of Polymer Science, Part A: Polymer Chemistry, vol. 47, No. 2, 2009, pp. 450-458.

Mazumdar et al., "Polymer nanocomposites using click chemistry: novel materials for hydrogen peroxide vapor sensors", Royal Society of Chemistry Advances, vol. 5, No. 85, 2015, pp. 69573-69582.

Nasrullah et al., "Synthesis of silicone resins containing polystyrene and poly(t-butyl acrylate) grafts using ATRP and "click" chemistry", PMSE Preprints, vol. 97, 2007, pp. 92-93.

Nega et al., "Synthesis of P3HT-b-PS donor-acceptor diblock copolymer carrying pendant fullerenes at precise positions along the PS block", European Polymer Journal, vol. 83, 2016, pp. 148-160.

Ni et al., "Nanoscale azide polymer functionalization: a robust solution for suppressing the carbon nanotube-polymer matrix thermal interface resistance", The Journal of Physical Chemistry C, vol. 119, No. 22, May 18, 2015, pp. 12193-12198.

Okcu et al., "Synthesis and characterization of telechelic block co-polymers by combination of atom transfer radical polymerization and click chemistry processes", Designed Monomers and Polymers, vol. 13, No. 5, 2010, pp. 459-472.

Opsteen, "Introduction of terminal azide and alkyne functionalities in polymers", Material Matters, vol. 3, No. 3, 2008, 3 Pages.

Ishizoe, Takashi et al., Anionic Polymerization of Monomers Containing Functional Group. 12. Anionic Equilibrium Polymerization of 4-Cyano-a-methylstyrene, Macromolecules, 1998, 31, 2797-2803.

Matsuo, Yuri et al., Tailored Synthesis of Triblock Co- and Terpolymers Composed of Synthetically Difficult Sequence Orders by Combin-

(56) References Cited

OTHER PUBLICATIONS ing Living Anionic Polymerization with Specially Designed Linking Reaction, Macromolecular Chemistry and Physics, 2016, 217,622-635.
Yamada, Masayuki et al., Synthesis of Side-Chain Liquid Crystalline Homopolymers and Block Copolymers with Cyanobiphenyl Moieties as Mesogen by Living Anionic Polymerization and Their Thermotropic Phase Behavior, Macromolecules, 1999, 32, 282-289.

\* cited by examiner

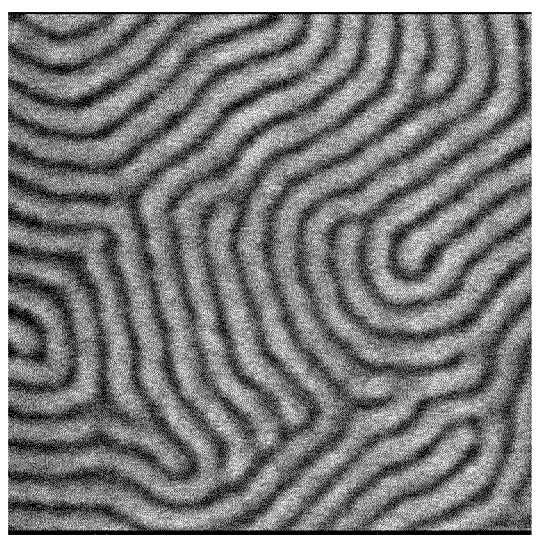

NON-THIOL NITROGEN BASED HYDROPHOBIC POLYMER BRUSH MATERIALS AND USE THEREOF FOR MODIFICATION OF SUBSTRATE SURFACES

This application is a national stage application, filed under 35 U.S.C. § 371, of International Patent Application No. PCT/EP2020/083135 (filed on 24 Nov. 2020) which claims the benefit of U.S. Provisional Patent Application No. 62/940,378 (filed on 26 Nov. 2019) each of which applications is incorporated herein by reference in their entirety.

FIELD OF THE INVENTION

The invention relates to novel functional styrenic or acrylic polymers and compositions thereof in an organic spin casting solvent, and methods for using these compositions to selectively deposit a pinning directing layer on metal surfaces, but not on non-metallic surfaces such as semiconductor or insulator surfaces (e.g. Si, GaAs, $SiO_2$, SiN, and the like) or polymeric surfaces (photoresist, spin on carbon, BARC). These selectively deposited pinning directing layers assist in affecting directed self-assembly of microdomains on an overlying block copolymers (BCP). These compositions and processes are useful for fabrication of electronic devices.

BACKGROUND

Self-assembly of block copolymers is a method useful for generating smaller and smaller patterned features for the manufacture of microelectronic devices in which the critical dimensions (CD) of features on the order of nanoscale can be achieved. Self-assembly methods are desirable for extending the resolution capabilities of microlithographic technology for repeating features such as an array of contact holes or posts. In a conventional lithography approach, ultraviolet (UV) radiation may be used to expose through a mask onto a photoresist layer coated on a substrate or layered substrate. Positive or negative photoresists are useful, and these can also contain a refractory element such as silicon to enable dry development with conventional integrated circuit (IC) plasma processing. In a positive photoresist, UV radiation transmitted through a mask causes a photochemical reaction in the photoresist such that the exposed regions are removed with a developer solution or by conventional IC plasma processing. Conversely, in negative photoresists, UV radiation transmitted through a mask causes the regions exposed to radiation to become less removable with a developer solution or by conventional IC plasma processing. An integrated circuit feature, such as a gate, via or interconnect, is then etched into the substrate or layered substrate, and the remaining photoresist is removed. When using conventional lithographic exposure processes, the dimensions of features of the integrated circuit feature are limited. Further reduction in pattern dimensions are difficult to achieve with radiation exposure due to limitations related to aberrations, focus, proximity effects, minimum achievable exposure wavelengths and maximum achievable numerical apertures. The need for large-scale integration has led to a continued shrinking of the circuit dimensions and features in the devices. In the past, the final resolution of the features has been dependent upon the wavelength of light used to expose the photoresist, which has its own limitations. Direct assembly techniques, such as graphoepitaxy and chemoepitaxy using block copolymer imaging, are highly desirable techniques used to enhance resolution while reducing CD variation. These techniques can be employed to either enhance conventional UV lithographic techniques or to enable even higher resolution and CD control in approaches employing EUV, e-beam, deep UV or immersion lithography. The directed self-assembly block copolymer comprises a block of etch resistant copolymeric unit and a block of highly etchable copolymeric unit, which when coated, aligned and etched on a substrate give regions of very high-density patterns.

In Grafted polymer which form covalently bound film on the surface of a substrate can be prepared by plasma deposition, electrochemical deposition or self-assembly. The strength of covalent bond predicates the adherence of film; however, these films are generally much more adherent than films which only interact through secondary forces with the surface of the substrate such as those prepared by spin casting. Consequently, because of this higher adherence formation of a grafted polymer film on a substrate material is useful for a variety of applications. Among these are:

One example are biomaterials where substrates are made bio compatible by grafting a polymer at the surface of a material, such as medical prostheses, without compromising bulk mechanical properties.

The grafting of polymers on substrate surfaces also has been employed to impart anti-bio fouling of these surfaces or to improve their corrosion resistance.

Coating solutions, where the grafting of a polymer on a substrate surface can change the surface properties of these substrates can be used to affect a better coating; also in suspension of metal or metal oxide nanoparticles the coating ability and stability of these suspensions may be improved by the grafting of polymers at the surface of these nanoparticles.

Self-assembly and directed self-assembly, where the grafting of polymer brushes on the surface of Silicon or Silicon oxide substrates can be employed for the formation of neutral layer on these surfaces which allow block copolymer to orient their domains perpendicular to the substrate surface during self-assembly or directed self-assembly.

Directed self-assembly of block copolymers is a method useful for generating smaller and smaller patterned features for the manufacture of microelectronic devices in which the critical dimensions (CD) of features on the order of nanoscale can be achieved. Directed self-assembly methods are desirable for extending the resolution capabilities of microlithographic technology. In a conventional lithography approach, ultraviolet (UV) radiation may be used to expose through a mask onto a photoresist layer coated on a substrate or layered substrate. Positive or negative photoresists are useful, and these can also contain a refractory element such as silicon to enable dry development with conventional integrated circuit (IC) plasma processing. In a positive photoresist, UV radiation transmitted through a mask causes a photochemical reaction in the photoresist such that the exposed regions are removed with a developer solution or by conventional IC plasma processing. Conversely, in negative photoresists, UV radiation transmitted through a mask causes the regions exposed to radiation to become less removable with a developer solution or by conventional IC plasma processing. An integrated circuit feature, such as a gate, via or interconnect, is then etched into the substrate or layered substrate, and the remaining photoresist is removed. When using conventional lithographic exposure processes, the dimensions of features of the integrated circuit feature are limited. Further reduction in pattern dimensions are difficult to achieve with radiation exposure due to limitations related to aberrations, focus, proximity effects, minimum achievable exposure wavelengths and maximum achievable numerical apertures. The need for large-scale integration has led to a continued shrinking of the circuit dimensions and features in the devices. In the past, the final resolution of the features has been dependent upon the wavelength of light used to expose the photoresist, which has its own limitations. Direct assembly techniques, such as graphoepitaxy and chemoepitaxy using block copolymer imaging, are highly desirable techniques used to enhance resolution while reducing CD variation. These techniques can be employed to either enhance conventional UV lithographic techniques or to enable even higher resolution and CD control in approaches employing EUV, e-beam, deep UV or immersion lithography. The directed self-assembly block copolymer comprises a block of etch resistant copolymeric unit and a block of highly etchable copolymeric unit, which when coated, aligned and etched on a substrate give regions of very high-density patterns.

In the graphoepitaxy directed self-assembly method, the block copolymers self organizes around a substrate that is pre-patterned with conventional lithography (Ultraviolet, Deep UV, e-beam, Extreme UV (EUV) exposure source) to form repeating topographical features such as a line/space (L/S) or contact hole (CH) pattern. In an example of a L/S directed self-assembly array, the block copolymer can form self-aligned lamellar regions which can form parallel line-space patterns of different pitches in the trenches between pre-patterned lines, thus enhancing pattern resolution by subdividing the space in the trench between the topographical lines into finer patterns. For example, a diblock copolymer which is capable of microphase separation and comprises a block rich in carbon (such as styrene or containing some other element like Si, Ge, Ti) which is resistant to plasma etch, and a block which is highly plasma etchable or removable, can provide a high-resolution pattern definition. Examples of highly etchable blocks can comprise monomers which are rich in oxygen and which do not contain refractory elements and are capable of forming blocks which are highly etchable, such as methyl methacrylate. The plasma etching gases used in the etching process of defining the self-assembly pattern typically are those used in processes employed to make integrated circuits (IC). In this manner very, fine patterns can be created in typical IC substrates that were definable by conventional lithographical techniques, thus achieving pattern multiplication. Similarly, features such as contact holes can be made denser by using graphoepitaxy in which a suitable block copolymer arranges itself by directed self-assembly around an array of contact holes or posts defined by conventional lithography, thus forming a denser array of regions of etchable and etch resistant domains which when etched give rise to a denser array of contact holes. Consequently, graphoepitaxy has the potential to offer both pattern rectification and pattern multiplication.

In chemical epitaxy or pinning chemical epitaxy the self-assembly of the block copolymer is formed around a surface that has regions of differing chemical affinity but no or very slight topography to guide the self-assembly process. For example, the surface of a substrate could be patterned with conventional lithography (UV, Deep UV, e-beam EUV) to create surfaces of different chemical affinity in a line and space (L/S) pattern in which exposed areas whose surface chemistry had been modified by irradiation alternate with areas which are unexposed and show no chemical change. These areas present no topographical difference but do present a surface chemical difference or pinning to direct self-assembly of block copolymer segments. Specifically, the directed self-assembly of a block copolymer whose block segments contain etch resistant (such as styrene repeat unit) and rapidly etching repeat units (such as methyl methacrylate repeat units) would allow precise placement of etch resistant block segments and highly etchable block segments over the pattern. This technique allows for the precise placement of these block copolymers and the subsequent pattern transfer of the pattern into a substrate after plasma or wet etch processing. Chemical epitaxy has the advantage that it can be fined tuned by changes in the chemical differences to help improve line-edge roughness and CD control, thus allowing for pattern rectification. Other types of patterns such as repeating contact holes (CH) arrays could also be pattern rectified using chemoepitaxy.

Neutral layers are layers on a substrate or the surface of a treated substrate which have no affinity for either of the block segment of a block copolymer employed in directed self-assembly. In the graphoepitaxy method of directed self-assembly of block copolymer, neutral layers are useful as they allow the proper placement or orientation of block polymer segments for directed self-assembly which leads to proper placement of etch resistant block polymer segments and highly etchable block polymer segments relative to the substrate. For instance, in surfaces containing line and space features which have been defined by conventional radiation lithography, a neutral layer allows block segments to be oriented so that the block segments are oriented perpendicular to the surface of the substrates, an orientation which is ideal for both pattern rectification and pattern multiplication depending on the length of the block segments in the block copolymer as related to the length between the lines defined by conventional lithography. If a substrate interacts too strongly with one of the block segments it would cause it to lie flat on that surface to maximize the surface of contact between the segment and the substrate; such a surface would perturb the desirable perpendicular alignment which can be used to either achieve pattern rectification or pattern multiplication based on features created through conventional lithography. Modification of selected small areas or pinning of substrate to make them strongly interactive with one block of the block copolymer and leaving the remainder of the surface coated with the neutral layer can be useful for forcing the alignment of the domains of the block copolymer in a desired direction, and this is the basis for the pinned chemoepitaxy or graphoepitaxy employed for pattern multiplication.

There is a need for a novel materials which can selectively form a grafted polymer layer on metal surfaces (Cu, W, Mo, Al, Zr, Ti, Hf, Au and the like) in the presence of non-metallic surfaces such as semiconductor or insulator substrates (e.g. Si, GaAs, $SiO_2$, SiN, SiON, and the like), or other non-metallic surfaces (surfaces of photoresist, spin on carbon or deposited carbon, bottom antireflective (BARC) coatings, and the like) through a simple spin coating, followed by a post coat bake to affect chemical bonding without the presence of activating components to promote the grafting reaction on the substrate such as acidic compounds, thermal acid generators, photoacid generator, thermal radical generators, photochemical radical generators, basic additives, thermal base generators or photobase generators. The presence of such thermally or photochemically reactive additives compounds is undesirable because the small size and reactivity of these compounds, they may lead them to diffuse out of the grafted film into other layers causing undesirable reaction such as corrosion. Another need is for a grafting material in which graftable polymer does not contain overly reactive grafting sites which may deleteriously affect shelf life of solutions of a grafting solution in an organic solvent such as a spin casting solvent. There is also a need for novel grafting material that can be made to have selective grafting towards specific types of substrates by altering grafting bake. In this manner one can alter the surface properties of these materials, such as coat-ability, and corrosion resistance by a simple spin coating process without having to use plasma deposition or electrochemical grafting, and also in the case of a novel selective grafting process using the novel materials of this invention, in one step coat only one type of material on a substrate which contains a topographical or chemical pattern in which different materials are present on one substrate. There is also a need for novel neutral layer compositions which when formed into a layer remain neutral to the self-assembly block copolymer and yet are not damaged by processing steps of directed self-assembly techniques and can further enhance the lithographic performance of the directed self-assembly materials and processes, especially reducing the number of processing steps and providing better pattern resolution with good lithographic performance. There is also a need for coat-able pinning materials for small areas of metal substrates otherwise coated with a neutral layer, for instance in the chemoepitaxy approach, in order to force the domains oriented perpendicularly with the neutral layer substrate to force the alignment of the domains in a desired direction. There is also a need for a grafting composition that will selectively only graft on one type of material on a substrate containing a pattern with different materials to create a pinning area.

The present invention relates to novel polymers and novel composition containing said novel polymers and an organic spin coating solvent. Said novel compositions when coated on a substrate containing both metal (e.g. Cu, W, Mo, Al, Zr, Ti, Hf, Ag, Au and the like), and non-metal surfaces such inorganic semiconductors or insulators (e.g. Si, GaAs, Ge, $SiO_2$, SiN (silicon nitride), SiON (silicon oxynitride) and the like), or other non-metallic surfaces (e.g. photoresist film, deposited carbon, spin on carbon, neutral layer, and the like) after heating produce, an insoluble film selectively on the metal surfaces but not on the non-metallic surfaces. Said insoluble film selectively attached to said metals surfaces may be attached by forming a grafted film, an insoluble crosslinked MAT film, or an insoluble film which is both grafted and crosslinked (grafted MAT). These films may act as protective barrier layer or in self-assembly of an overlying block copolymer layer serve as a pinning layer material.

DETAILED DESCRIPTION OF DRAWINGS

FIG. 1

Top Down SEM images in a 0.5FOV field of a Self-Assembled fingerprint pattern obtained from Example 7 coating 35 (Lo=30 nm, film thickness is 30 nm at 1500 rpm) and annealed at 250° C. on a grafted film of the material of Synthesis Example 1 on a W wafer coupon.

SUMMARY OF INVENTION

One aspect of this invention is a novel functional polymer comprising either acrylic repeat units, styrenic repeat units or a mixture of these having a polydispersity from 1 to about 1.12 comprising at least one reactive moiety selected from
 a moiety comprising at least one N-coordinative functional group having at least one lone pair of electrons,
 a moiety comprising a dialkylsilyl group, or
 a mixture of both groups,
wherein said reactive moiety is present in said functional polymer either on a repeat unit, on an end group or on both, and
said N-coordinative functional group is either
 a monodentate N-coordinative functional group,
 a polydendate N-coordinative group or
 a mixture thereof, and
said monodentate N-coordinative functional group is an azide moiety (—$N_3$) or a cyano moiety (—CN), and said polydendate N-coordinative functional group is either
 a moiety comprising 2 or 3 monocyclic heteroaryl moieties, wherein each said heteroaryl individually contains 1 to 3 nitrogen hetero atoms, or
 a polycyclic fused ring heteroaryl moiety containing 2 to 4 nitrogen heteroatoms.

Another aspect of this invention is a novel functional acrylic polymer having a polydispersity from 1 to about 1.12 comprising either a moiety comprising at least one azide moiety (—$N_3$), or a moiety comprising at least one cyano moiety (—CN), and a dialkylsilyl group.

Further, this invention also pertains to novel compositions in a solvent of either the said novel functional styrenic polymer or said novel functional acrylic polymer or a mixture thereof.

Another aspect of this invention is the use of said functional polymer or said compositions for forming an attached film selectively on a metal substrate.

Further, this invention also pertains to the novel process of coating said compositions on a substrate, and, after baking, selectively forming an attached film (either a brush pinning layer, a crosslinked MAT pinning layer or a crosslinked brush pinning) on said metal areas of a substrate but not on non-metallic surfaces areas of said substrate.

Said selectively attached film, forming a pinning layer, may assist in this capacity, when used with a neutral layer, to enable directed self-assembly, during annealing, of a overcoated block copolymer containing etch resistant and etchable block forming a repeating pattern, which when etched transfers this pattern etched in said substrate.

DETAILED DESCRIPTION OF THE INVENTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms such as "includes" and "included", is not limiting. Also, terms such as "element" or "component" encompass both elements and components comprising one unit and elements or components that comprise more than one unit, unless specifically stated otherwise. As used herein, the conjunction "and" is intended to be inclusive and the conjunction "or" is not intended to be exclusive unless otherwise indicated. For example, the phrase "or, alternatively" is intended to be exclusive. As used herein, the term "and/or" refers to any combination of the foregoing elements including using a single element.

The term C-1 to C-4 alkyl embodies methyl and C-2 to C-4 linear alkyls and C-3 to C-4 branched alkyl moieties, for example as follows: methyl (—$CH_3$), ethyl (—$CH_2$—$CH_3$), n-propyl (—$CH_2$—$CH_2$—$CH_3$), isopropyl (—$CH(CH_3)_2$, n-butyl (—$CH_2$—$CH_2$—$CH_2$—$CH_3$), tert-butyl (—$C(CH_3)_3$), isobutyl ($CH_2$—$CH(CH_3)_2$, 2-butyl (—CH ($CH_3$)$CH_2$—$CH_3$). Similarly, the term C-1 to C-8 embodies methyl C-2 to C-8 linear, C-3 to C-8 branched alkyls, C-4 to C-8 cycloalkyls (e.g. cyclopentyl, cyclohexyl etc.) or C-5-C-8 alkylenecycloalkyls (e.g. —$CH_2$-cyclohexyl, $CH_2$—$CH_2$-cyclopentyl etc.

The term C-1 to C-4 alkylene embodies methylene and C-2 to C-4 linear alkylene moieties (e.g. ethylene, propylene etc.) and C-3 to C-4 branched alkylene moieties (e.g. —CH($CH_3$)—, —CH($CH_3$)—$CH_2$—, etc.).

Herein the term pinning layer refers to a directing layer which is either hydrophobic or hydrophilic. In this application the styrenic pinning layer are hydrophobic, while the acrylic pinning layer are hydrophilic in nature. Respectively, these hydrophobic layers act as pinning layers for hydrophobic block copolymer domains, while the hydrophilic layers act as pinning layer for hydrophilic block copolymer domains during directed self-assembly.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature documents, and similar materials, defines a term in a manner that contradicts the definition of that term in this application, this application controls.

Herein, unless otherwise indicated, the term acrylic as used herein encompasses repeat unit derived from acrylate derivatives generally, as non-limiting examples, ones derived from acrylate derivatives s having the following structure, wherein the Alkyl moiety may be a C-1 to C-8 alkyl or H, and Xacryl is either H or a C-1 to C-4 alkyl:

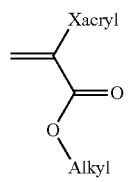

Herein, unless otherwise indicated, the term styrenic as used herein encompasses repeat units derived from styrene derivative generally, as non-limiting examples, ones derived from styrene derivatives having the following structure wherein Xsty moiety is H or a C-1 to C-4 alkyl and the Rsty moiety is H or a C-1 to C-8 moiety:

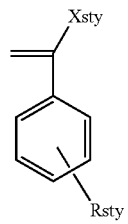

One aspect of this invention is a novel functional styrenic polymer having a polydispersity from 1 to about 1.12 comprising at least one reactive moiety, selected from
 a moiety comprising at least one N-coordinative functional group having at least one lone pair of electrons,
 a moiety comprising a dialkylsilyl group, or
 a mixture of both groups,
wherein said reactive moiety is present in said functional styrenic polymer either on a repeat unit, on an end group or on both, and
said N-coordinative functional group is either
 a monodentate N-coordinative functional group,
 a polydendate N-coordinative group or
 a mixture thereof, and
said monodentate N-coordinative functional group is an azide moiety (—$N_3$), or a cyano moiety (—CN) and said polydendate N-coordinative functional group is either a moiety comprising 2 or 3 monocyclic heteroaryl moieties, wherein each said heteroaryl individually contains 1 to 3 nitrogen hetero atoms, or a polycyclic fused ring heteroaryl moiety containing 2 to 4 nitrogen heteroatoms.

In another aspect of said novel functional polymer described herein it may have a polydispersity ranging from 1 to about 1.11. In another aspect this polydispersity may range from 1 to about 1.10. In another aspect this polydispersity may range from 1 to about 1.09. In another aspect this polydispersity may range from 1 to about 1.08. In another aspect this polydispersity may range from 1 to about 1.07. In another aspect this polydispersity may range from 1 to about 1.06. In another aspect this polydispersity may range from 1 to about 1.05. In another aspect this polydispersity may range from 1 to about 1.04. In another aspect this polydispersity may range from 1 to about 1.03. In another aspect this polydispersity may range from 1 to about 1.02. In another aspect this polydispersity may range from 1 to about 1.01. In another aspect this polydispersity is 1.00.

In another aspect of said novel functional polymer described herein it may have a polydispersity ranging from 1 to about 1.13. In another aspect this polydispersity may range from 1 to about 1.14. In another aspect this polydispersity may range from 1 to about 1.15. In another aspect this polydispersity may range from 1 to about 1.16. In another aspect this polydispersity may range from 1 to about 1.17. In another aspect this polydispersity may range from 1 to about 1.18. In another aspect this polydispersity may range from 1 to about 1.19. In another aspect this polydispersity may range from 1 to about 1.20.

In another aspect of said functional polymer, described above, it is one having as repeat units only styrenic repeat units In another aspect said novel functional polymers described herein it may have an $M_w$ (weight average molecular weight) ranging from about 2K to about 20K. In another aspect the $M_w$ may range from about 4K to about 15K. In yet another embodiment $M_w$ may range from about 4K to about 6K.

In one embodiment of said inventive functional polymer, described herein, said reactive moiety is said monodentate N-coordinative functional group. In one aspect of this embodiment said monodentate N-coordinative functional group is said azide moiety. In one aspect of this embodiment it is said cyano moiety. In another aspect of this embodiment said functional polymer is one having as repeat units only styrenic repeat units.

In another embodiment said inventive functional polymer, it is one wherein said reactive moiety is said polydentate N-coordinative functional group. In another aspect of this embodiment said functional polymer is one having as repeat units only styrenic repeat units.

In another embodiment of said inventive functional polymer, described herein, it is one wherein said reactive moiety is a mixture of said monodentate and polydentate N-coordinative functional groups. In another aspect of this embodiment said functional polymer is one having as repeat units only styrenic repeat units.

In another embodiment of said inventive functional polymer, described herein, it is one wherein, said reactive moiety is said dialkylsilyl group. In another aspect of this embodiment said functional polymer is one having as repeat units only styrenic repeat units.

In another embodiment of said inventive functional polymer, described herein, it is one having structure (I); wherein n is the number of repeating units in the polymer; $R_1$ is H or a C-1 to C-4 linear alkyl; $R_2$ is selected from a C-1 to C-8 linear alkyl, a C-3 to C-8 branched alkyl and a C-3 to C-8 cyclic alkyl; $R_s$ is selected from H a C-1 to C-8 linear alkyl, a C-3 to C-8 branched alkyl and a C-3 to C-8 cyclic alkyl; $R_3$ is selected from H, a C-1 to C-8 linear alkyl, a C-3 to C-8 branched alkyl and a C-3 to C-8 cyclic alkyl; and a dialkylsilyl moiety [$(R_{si})(R_{sia})$ SiH—] wherein $R_{si}$ and $R_{sia}$ are independently selected from a C-1 to C-8 linear alkyl, a C-3 to C-8 branched alkyl and a C-3 to C-8 cyclic alkyl; X and $X_a$ are independently selected from a direct valence bond,
- a C-1 to C-8 linear alkylene moiety, a C-3 to C-8 branched alkylene moiety, a C-3 to C-8 cyclic alkylene moiety, and a —$X_1$—O—$X_2$— (-alkyleneoxyalkylene-) moiety wherein $X_1$ and $X_2$ are independently selected from a C-1 to C-8 linear alkylene, a C-3 to C-8 branched alkylene and
- a C-3 to C-8 cyclic alkylene; and DN is an azide moiety (—$N_3$), or a cyano moiety (—CN).

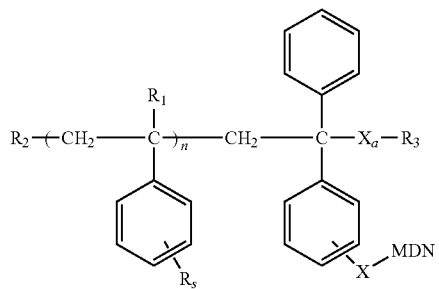

(I)

In another embodiment of said functional polymer, described herein, it is one having structure (Icn); wherein n is the number of repeating units in the polymer; $R_1$ is H or a C-1 to C-4 linear alkyl; $R_2$ is selected from a C-1 to C-8 linear alkyl, a C-3 to C-8 branched alkyl and a C-3 to C-8 cyclic alkyl; $R_2$ is selected from a C-1 to C-8 linear alkyl, a C-3 to C-8 branched alkyl and a C-3 to C-8 cyclic alkyl; $R_s$ is selected from H, a C-1 to C-8 linear alkyl, a C-3 to C-8 branched alkyl and a C-3 to C-8 cyclic alkyl; $R_3$ is selected from H, a C-1 to C-8 linear alkyl, a C-3 to C-8 branched alkyl, a C-3 to C-8 cyclic alkyl and a dialkylsilyl moiety [$(R_{si})(R_{sia})$ SiH—], wherein $R_{si}$ and $R_{sia}$ are independently selected from a C-1 to C-8 linear alkyl, a C-3 to C-8 branched alkyl and a C-3 to C-8 cyclic alkyl; and X and $X_a$ are independently selected from a direct valence bond, a C-1 to C-8 linear alkylene moiety, a C-3 to C-8 branched alkylene moiety, a C-3 to C-8 cyclic alkylene moiety, and a —$X_1$—O—$X_2$— (-alkyleneoxyalkylene-) moiety wherein $X_1$ and $X_2$ are independently selected from a C-1 to C-8 linear alkylene, a C-3 to C-8 branched alkylene and a C-3 to C-8 cyclic alkylene. In another aspect of this embodiment $R_3$ is either a C-1 to C-8 linear alkyl, a C-3 to C-8 branched alkyl or a C-1 to C-8 cyclic alkyl. In yet another aspect of this embodiment $R_3$ is H.

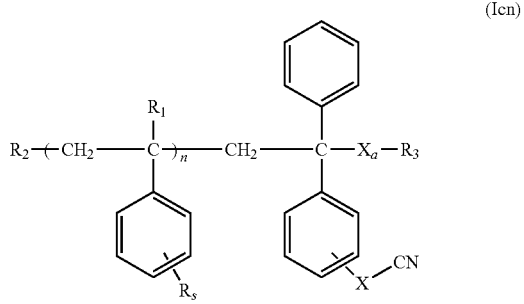

(Icn)

In another embodiment of said functional polymer, described herein, it is one having structure (In3). In another aspect of this embodiment $R_3$ is said dialkysilyl end group. In another aspect of this embodiment $R_3$ is either a C-1 to C-8 linear alkyl, a C-3 to C-8 branched alkyl or a C-1 to C-8 cyclic alkyl. In yet another aspect of this embodiment $R_3$ is H.

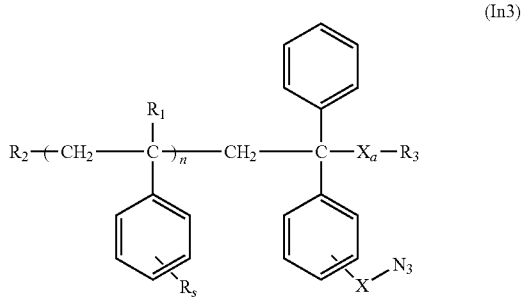

(In3)

In another embodiment of said inventive functional styrenic polymer, described herein, it is one having structure (II); wherein na is the number of repeating units in the polymer; $R_{1a}$ is H or a C-1 to C-4 linear alkyl; $R_s$ is selected from H, a C-1 to C-8 linear alkyl, a C-3 to C-8 branched alkyl and a C-3 to C-8 cyclic alkyl; $R_{2a}$ is selected from a C-1 to C-8 linear alkyl, a C-3 to C-8 branched alkyl and a C-3 to C-8 cyclic alkyl; $X_b$ is selected from a C-1 to C-8 linear alkylene, a C-3 to C-8 branched alkylene, a C-3 to C-8 cyclic alkylene and a —$X_{1a}$—O—$X_{2a}$— (-alkyleneoxyalkylene-) moiety wherein $X_{1a}$ and $X_{2a}$ are independently selected from a C-1 to C-8 linear alkylene, a C-3 to C-8 branched alkylene and a C-3 to C-8 cyclic alkylene; and MDN is an azide moiety (—$N_3$), or a cyano moiety (CN);

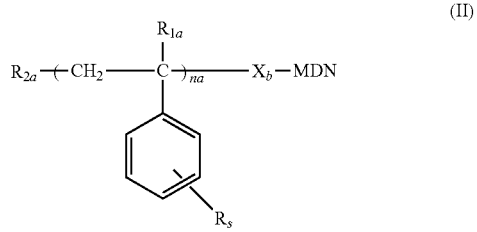

(II)

In another embodiment of said inventive functional styrenic polymer, described herein, it is one having structure (IIn3).

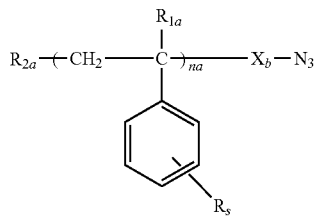
(IIn3)

In another embodiment of said inventive functional styrenic polymer, described herein, it is one having structure (IIcn).

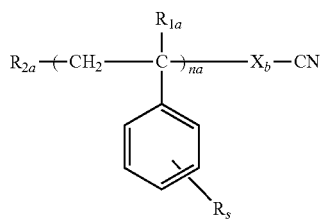
(IIcn)

In another embodiment of said inventive functional styrenic polymer, described herein, it is one having structure (IIcn). In another aspect of this embodiment $R_{3a}$ is either a C-1 to C-8 linear alkyl, a C-3 to C-8 branched alkyl or a C-1 to C-8 cyclic alkyl. In yet another aspect of this embodiment $R_{3a}$ is H.

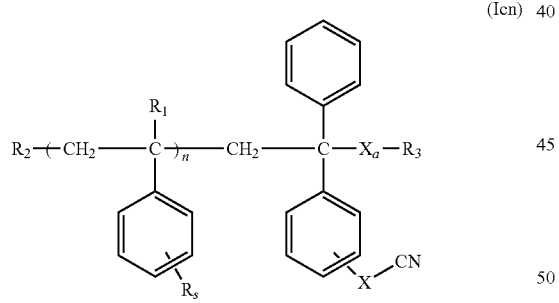
(Icn)

In another embodiment of said inventive functional polymer, described herein, it is one having structure (III); wherein nb is the number of repeating units in the polymer; $R_{1b}$ is H or a C-1 to C-4 linear alkyl; $R_s$ is selected from H, a C-1 to C-8 linear alkyl, a C-3 to C-8 branched alkyl and a C-3 to C-8 cyclic alkyl; $R_{2b}$ is selected from a C-1 to C-8 linear alkyl, a C-3 to C-8 branched alkyl and a C-3 to C-8 cyclic alkyl; $X_c$ is selected from a direct valence bond, a C-1 to C-8 linear alkylene, a C-3 to C-8 branched alkylene, a C-3 to C-8 cyclic alkylene, and a —$X_{1b}$—O—$X_{2b}$— (-alkyleneoxyalkylene-) moiety wherein $X_{1b}$ and $X_{2b}$ are independently selected from a C-1 to C-8 linear alkylene, a C-3 to C-8 branched alkylene and a C-3 to C-8 cyclic alkylene; and $R_4$ is a polydentate N-coordinative functional group having a structure selected from moieties (IIIa), (IIIb), (IIIc), (IIId), (IIIe), (IIIf), (IIIg), (IIIh), (IIIi), (IIIj), and (IIIk), wherein * designate the attachment point of these polydentate moieties to structure (III).

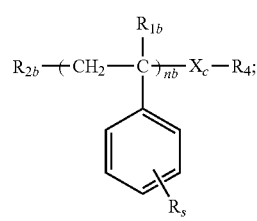
(III)

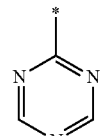
(IIIa)

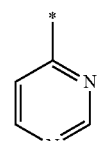
(IIIb)

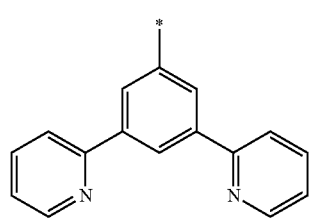
(IIIc)

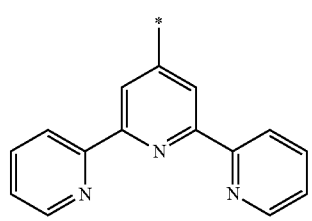
(IIId)

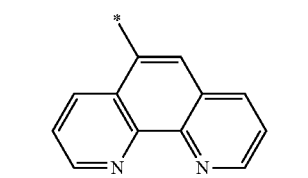
(IIIe)

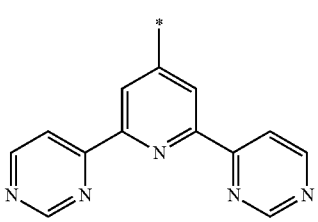
(IIIf)

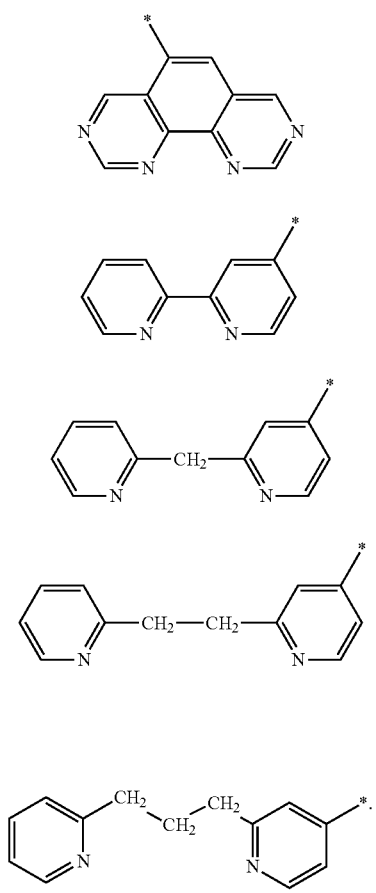

(IIIg)

(IIIh)

(IIIi)

(IIIj)

(IIIk)

In another embodiment of said functional polymer, described herein, it is a diblock copolymer having structure (IV) wherein; nc is the number of repeating units in a first block and nd is the number of repeat units in a second block; $R_{1c}$ is H or a C-1 to C-4 linear alkyl; $R_s$ is selected from H a C-1 to C-8 linear alkyl, a C-3 to C-8 branched alkyl and a C-3 to C-8 cyclic alkyl; $R_{2c}$ is selected from a C-1 to C-8 linear alkyl, a C-3 to C-8 branched alkyl and a C-3 to C-8 cyclic alkyl;

$X_d$ and $X_e$ are independently selected from a direct valence bond, a C-1 to C-8 linear alkylene, a C-3 to C-8 branched alkylene, a C-3 to C-8 cyclic alkylene, and a —$X_{1c}$—O—$X_{2c}$— (-alkyleneoxyalkylene-) moiety wherein $X_{1c}$ and $X_{2c}$ are independently selected from a C-1 to C-8 linear alkylene, a C-3 to C-8 branched alkylene and a C-3 to C-8 cyclic alkylene; $R_{3a}$ is selected from H, a C-1 to C-8 linear alkyl, a C-3 to C-8 branched alkyl, a C-1 to C-8 cyclic alkyl and a dialkylsilyl moiety [($R_{sib}$)($R_{sic}$) SiH—] wherein $R_{sib}$ and $R_{sic}$ are independently selected from a C-1 to C-8 linear alkyl, a C-3 to C-8 branched alkyl and a C-3 to C-8 cyclic alkyl; and MDN is an azide moiety (—$N_3$), or a cyano moiety (—CN). In another aspect of this embodiment $R_{3a}$ is said dialkysilyl end group. In another aspect of this embodiment $R_{3a}$ is either a C-1 to C-8 linear alkyl, a C-3 to C-8 branched alkyl or a C-1 to C-8 cyclic alkyl. In yet another aspect of this embodiment $R_{3a}$ is H.

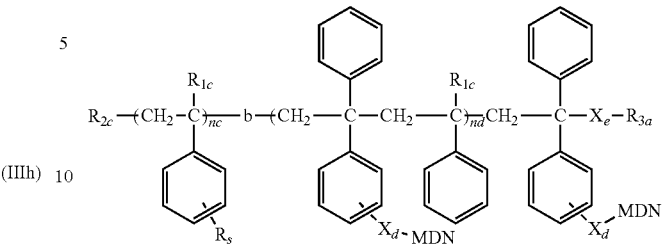

(IV)

In another embodiment of said functional polymer, described herein, it is a diblock copolymer having structure (IVn3). In another aspect of this embodiment $R_{3a}$ is said dialkysilyl end group. In another aspect of this embodiment $R_{3a}$ is either a C-1 to C-8 linear alkyl, a C-3 to C-8 branched alkyl or a C-1 to C-8 cyclic alkyl. In yet another aspect of this embodiment $R_{3a}$ is H.

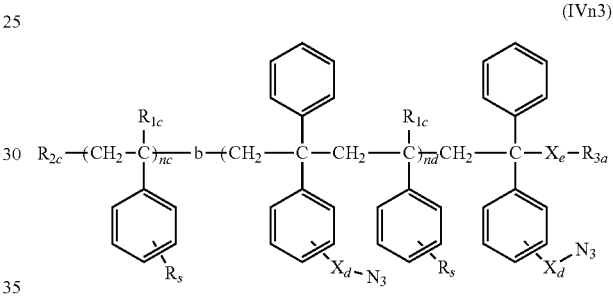

(IVn3)

In another embodiment of said functional polymer, described herein, it is a diblock copolymer having structure (IVen). In another aspect of this embodiment $R_{3a}$ is said dialkysilyl end group. In another aspect of this embodiment $R_{3a}$ is either a C-1 to C-8 linear alkyl, a C-3 to C-8 branched alkyl or a C-1 to C-8 cyclic alkyl. In yet another aspect of this embodiment $R_{3a}$ is H.

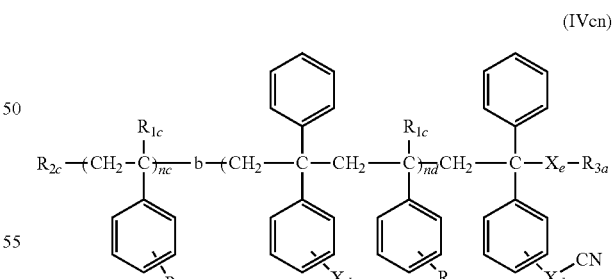

(IVcn)

In another embodiment of said functional polymer, described herein, it is a diblock copolymer having structure (IVcnn3). In another aspect of this embodiment $R_{3a}$ is said dialkysilyl end group. In another aspect of this embodiment $R_{3a}$ is either a C-1 to C-8 linear alkyl, a C-3 to C-8 branched alkyl or a C-1 to C-8 cyclic alkyl. In yet another aspect of this embodiment $R_{3a}$ is H.

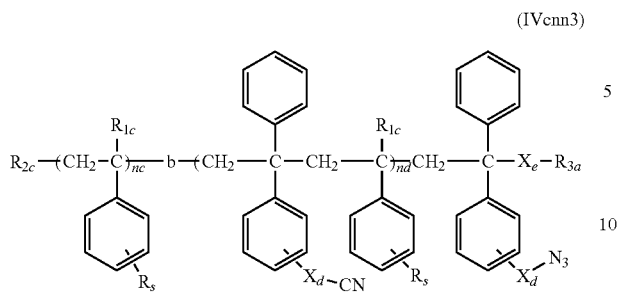

(IVcnn3)

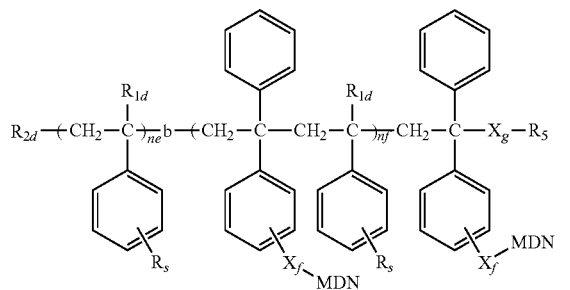

(V)

In another embodiment of said functional polymer, described herein, it is a diblock copolymer having structure (IVn3cn). In another aspect of this embodiment $R_{3a}$ is said dialkysilyl end group. In another aspect of this embodiment $R_{3a}$ is either a C-1 to C-8 linear alkyl, a C-3 to C-8 branched alkyl or a C-1 to C-8 cyclic alkyl. In yet another aspect of this embodiment $R_{3a}$ is H.

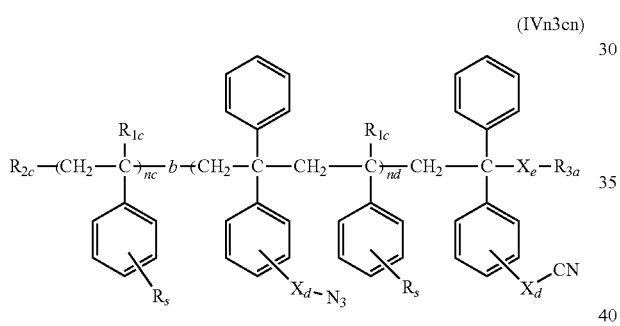

(IVn3cn)

In another embodiment of said functional polymer, described herein, it is a diblock copolymer having structure (V). wherein ne is the number of repeating units in a first block and nf is the number of repeat units in a second block; Rid is H or a C-1 to C-4 linear alkyl;

$R_s$ is selected from H, a C-1 to C-8 linear alkyl, a C-3 to C-8 branched alkyl and a C-3 to C-8 cyclic alkyl; $R_{2d}$ is selected from a C-1 to C-8 linear alkyl a C-3 to C-8 branched alkyl and a C-3 to C-8 cyclic alkyl; $X_f$ and $X_g$ are independently selected from a direct valence bond, a C-1 to C-8 linear alkylene, a C-3 to C-8 branched alkylene, a C-3 to C-8 cyclic alkylene, and a —$X_{1d}$—O—$X_{2d}$— (-alkyleneoxyalkylene-) moiety wherein $X_{1d}$ and $X_{2d}$ are independently selected from a C-1 to C-8 linear alkylene, a C-3 to C-8 branched alkylene, and a C-3 to C-8 cyclic alkylene; $R_5$ is a polydentate N-coordinative functional group having a structure selected from moieties (IIIa), (IIIb), (IIIc), (IIId), (IIIe), (IIIf), (IIIg), (IIIh), (IIIi), (IIIj), and (IIIk), wherein * designate the attachment point of these polydentate moieties to structure (V), and MDN is an azide moiety (—$N_3$), or a cyano moiety (CN).

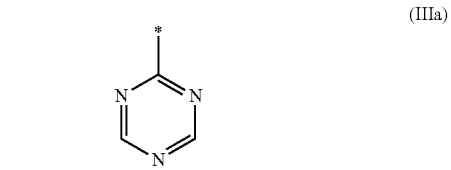

(IIIa)

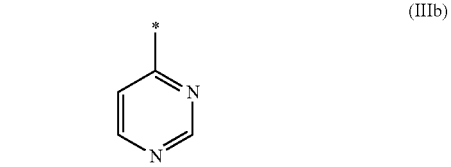

(IIIb)

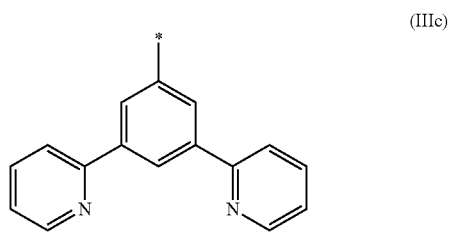

(IIIc)

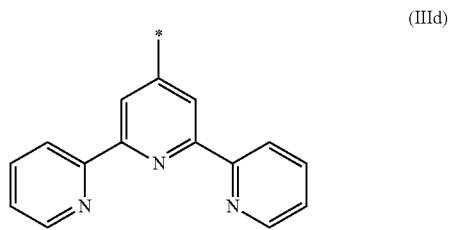

(IIId)

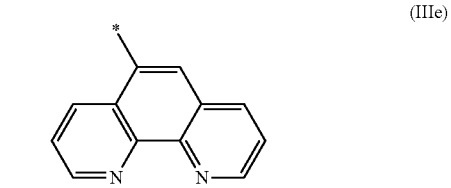

(IIIe)

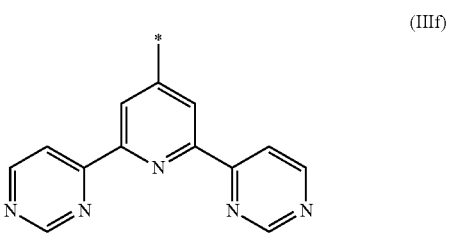

(IIIf)

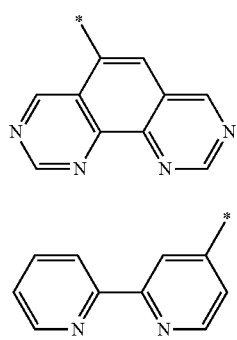

(IIIg)

(IIIh)

(IIIi)

(IIIj)

(IIIk)

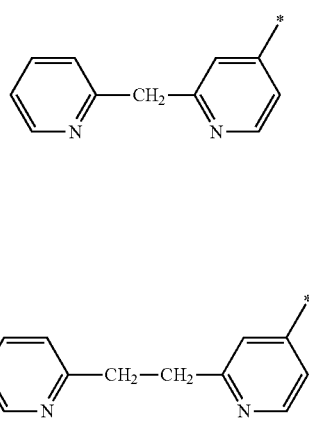

In another embodiment of said functional polymer, described herein, where it is a diblock copolymer having structure (V) it has the more specific structure (Vn3);

(Vn3)

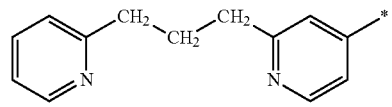

In another embodiment of said functional polymer, described herein, where it is a diblock copolymer having structure (V) it has the more specific structure (Vcn).

(Vcn)

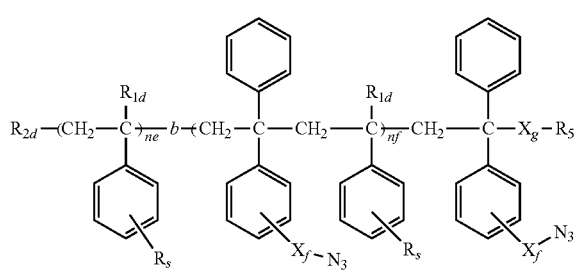

In another embodiment of said functional polymer, described herein, where it is a diblock copolymer having structure (V) it has the more specific structure (Vcnn3);

(Vcnn3)

In another embodiment of said functional polymer, described herein, where it is a diblock copolymer having structure (V) it has the more specific structure (Vn3cn);

(Vn3cn)

In another embodiment of said functional polymer, described herein, it has structure (VI); wherein n is the number of repeating units in the polymeric segment; nos is the number of repeating units in the oligomeric segment and ranges from 1 to 10, $R_1$ is H or a C-1 to C-4 linear alkyl; $R_s$ is selected from H, a C-1 to C-8 linear alkyl, a C-3 to C-8 branched alkyl and a C-3 to C-8 cyclic alkyl; $R_{dp}$ is H or a C-1 to C-4 linear alkyl; $R_2$ is selected from a C-1 to C-8 linear alkyl, a C-3 to C-8 branched alkyl and a C-3 to C-8 cyclic alkyl; and $R_{CN}$ is selected from H, a C-1 to C-8 linear alkyl, a C-3 to C-8 branched alkyl and a C-3 to C-8 cyclic alkyl; and a dialkylsilyl moiety [$(R_{si})(R_{sia})$ SiH—] wherein $R_{si}$ and $R_{sia}$ are independently selected from a C-1 to C-8 linear alkyl, a C-3 to C-8 branched alkyl and a C-3 to C-8 cyclic alkyl; $X_a$ is selected from a direct valence bond, a C-1 to C-8 linear alkylene moiety, a C-3 to C-8 branched alkylene moiety, a C-3 to C-8 cyclic alkylene moiety, and a —$X_1$—$X_2$— (-alkyleneoxyalkylene-) moiety wherein $X_1$ and $X_2$ are independently selected from a C-1 to C-8 linear alkylene, a C-3 to C-8 branched alkylene and a C-3 to C-8 cyclic alkylene; and DN is an azide moiety (—$N_3$), or a cyano moiety (—CN).

In a more specific embodiment nos ranges from 1 to 6. In another aspect of this embodiment $R_{cn}$ is said dialkysilyl end group. In another aspect of this embodiment $R_{cn}$ is either a C-1 to C-8 linear alkyl, a C-3 to C-8 branched alkyl or a C-1 to C-8 cyclic alkyl. In yet another aspect of this embodiment $R_{cn}$ is H.

(VI)

[Structure VI diagram]

In another embodiment of said functional polymer, having structure (VI) it has the more specific structure (VIn3). In a more specific embodiment nos ranges from 1 to 6. In another aspect of this embodiment $R_{cn}$ is said dialkysilyl end group. In another aspect of this embodiment $R_{cn}$ is either a C-1 to C-8 linear alkyl, a C-3 to C-8 branched alkyl or a C-1 to C-8 cyclic alkyl. In yet another aspect of this embodiment $R_{cn}$ is H.

(VIn3)

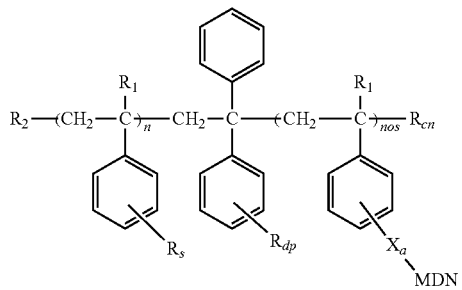

In another embodiment of said functional polymer, having structure (VI) it has the more specific structure (VIcn). In a more specific embodiment nos ranges from 1 to 6. In another aspect of this embodiment Re is said dialkysilyl end group. In another aspect of this embodiment $R_{cn}$ is either a C-1 to C-8 linear alkyl, a C-3 to C-8 branched alkyl or a C-1 to C-8 cyclic alkyl. In yet another aspect of this embodiment $R_{cn}$ is H.

(VIcn)

[Structure VIcn diagram]

In another embodiment of said functional polymer, described herein, it has structure (VII); wherein n is the number of repeating units in the styrenic polymer segment; nacr is the number of repeating units in the acrylic polymer segment; nos is the number of repeat unit in the styrenic oligomeric segment and ranges from 1 to 10, $R_1$ is H or a C-1 to C-4 linear alkyl; $R_s$ is selected from H, a C-1 to C-8 linear alkyl, a C-3 to C-8 branched alkyl and a C-3 to C-8 cyclic alkyl; $R_{1ac}$ is H or a C-1 to C-4 linear alkyl; $R_{3ac}$ is selected from a C-1 to C-8 linear alkyl, a C-3 to C-8 branched alkyl and a C-3 to C-8 cyclic alkyl; and $R_{4ac}$ is selected from H, a C-1 to C-8 linear alkyl, a C-3 to C-8 branched alkyl and a C-3 to C-8 cyclic alkyl; and a dialkylsilyl moiety [($R_{si}$)($R_{sia}$)SiH—] wherein $R_{si}$ and $R_{sia}$ are independently selected from a C-1 to C-8 linear alkyl, a C-3 to C-8 branched alkyl and a C-3 to C-8 cyclic alkyl; and $R_{dp}$ is H or a C-1 to C-4 linear alkyl;

$X_a$ and $X_{aac}$ are independently selected from a direct valence bond, a C-1 to C-8 linear alkylene moiety, a C-3 to C-8 branched alkylene moiety, a C-3 to C-8 cyclic alkylene moiety, and a —$X_1$—O—$X_2$— (-alkyleneoxyalkylene-) moiety wherein $X_1$ and $X_2$ are independently selected from a C-1 to C-8 linear alkylene, a C-3 to C-8 branched alkylene and a C-3 to C-8 cyclic alkylene; and MDN is an azide moiety (—$N_3$), or a cyano moiety (—CN). In another aspect of this embodiment $R_{4ac}$ is said dialkysilyl end group. In another aspect of this embodiment $R_{4ac}$ is either a C-1 to C-8 linear alkyl, a C-3 to C-8 branched alkyl or a C-1 to C-8 cyclic alkyl. In another embodiment $X_{aac}$ is a direct valence bond. In yet another aspect of this embodiment $R_{4ac}$ is H. In another aspect of this embodiment nos ranges from 1 to 6.

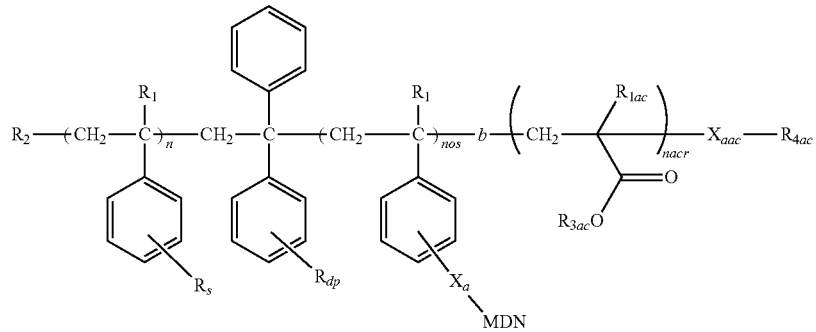

(VII)

In another embodiment of said functional polymer, having structure (VII) it has the more specific structure (VIIn3). In another aspect of this embodiment $R_{4ac}$ is said dialkysilyl end group. In another aspect of this embodiment $R_{4ac}$ is either a C-1 to C-8 linear alkyl, a C-3 to C-8 branched alkyl or a C-1 to C-8 cyclic alkyl. In another embodiment $X_{aac}$ is a direct valence bond. In yet another aspect of this embodiment $R_{4ac}$ is H. In another aspect of this embodiment nos ranges from 1 to 6.

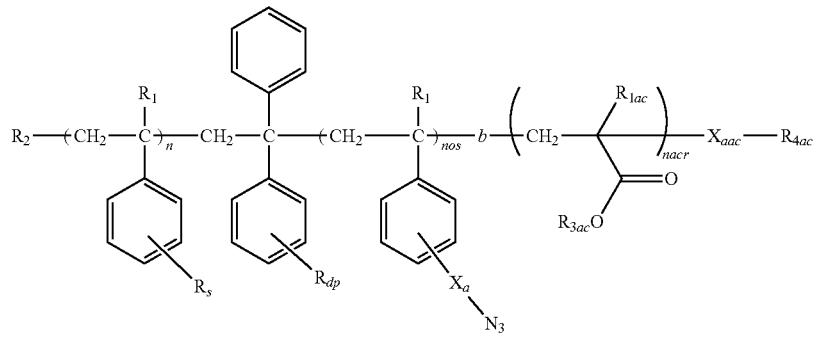

(VIIn3)

In another embodiment of said functional polymer, having structure (VII) it has the more specific structure (VIIcn). In another aspect of this embodiment $R_{4ac}$ is said dialkysilyl end group. In another aspect of this embodiment $R_{4ac}$ is either a C-1 to C-8 linear alkyl, a C-3 to C-8 branched alkyl or a C-1 to C-8 cyclic alkyl. In another embodiment $X_{aac}$ is a direct valence bond. In yet another aspect of this embodiment $R_{4ac}$ is H. In another aspect of this embodiment nos ranges from 1 to 6.

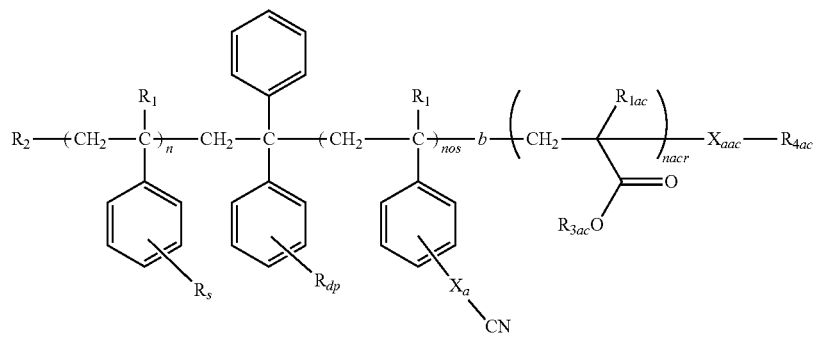

(VIIcn)

In another embodiment of said functional polymer, described herein, it has structure (VIII), wherein nh is the number of repeating units in the polymer; $R_{1f}$ is H or a C-1 to C-4 linear alkyl; $R_s$ is selected from H, a C-1 to C-8 linear alkyl, a C-3 to C-8 branched alkyl and a C-3 to C-8 cyclic alkyl; $R_{2f}$ is selected from a C-1 to C-8 linear alkyl, a C-3 to C-8 branched alkyl and a C-3 to C-8 cyclic alkyl; $X_e$ is selected from a C-1 to C-8 linear alkylene, a C-3 to C-8 branched alkylene, a C-3 to C-8 cyclic alkylene, and a $-X_{1f}-O-X_{2f}-$ (-alkyleneoxyalkylene-) moiety wherein $X_{1f}$ and $X_{2f}$ are independently selected from a C-1 to C-8 linear alkylene, a C-3 to C-8 branched alkylene and a C-3 to C-8 cyclic alkylene; $R_7$ and $R_8$ are independently selected from a C-1 to C-8 linear alkyl, a C-3 to C-8 branched alkyl and a C-3 to C-8 cyclic alkyl.

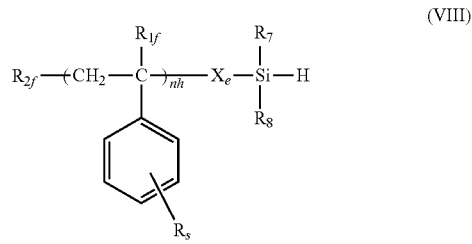

(VIII)

In another embodiment of said functional polymer, described herein, it has structure (VIV); wherein In another embodiment of said functional polymer, described herein, nacr is the number of repeating units in the acrylic polymer segment; $R_{1ac}$ is H or a C-1 to C-4 linear alkyl; $R_{2ac}$ is selected from a C-1 to C-8 linear alkyl, a C-3 to C-8 branched alkyl and a C-3 to C-8 cyclic alkyl; $R_{3ac}$ is selected from a C-1 to C-8 linear alkyl, a C-3 to C-8 branched alkyl, a C-3 to C-8 cyclic alkyl; and $R_{4ac}$ is selected from H, a C-1 to C-8 linear alkyl, a C-3 to C-8 branched alkyl and a C-3 to C-8 cyclic alkyl; and a dialkylsilyl moiety [$(R_{si})(R_{sia})$SiH—] wherein $R_{si}$ and $R_{sia}$ are independently selected from a C-1 to C-8 linear alkyl, a C-3 to C-8 branched alkyl and a C-3 to C-8 cyclic alkyl; and $X_{ac}$ and $X_{aac}$ are independently selected from a direct valence bond, a C-1 to C-8 linear alkylene moiety, a C-3 to C-8 branched alkylene moiety, a C-3 to C-8 cyclic alkylene moiety, and a $-X_1-O-X_2-$ (-alkyleneoxyalkylene-) moiety wherein $X_1$ and $X_2$ are independently selected from a C-1 to C-8 linear alkylene, a C-3 to C-8 branched alkylene and a C-3 to C-8 cyclic alkylene; and MDN is an azide moiety ($-N_3$), or a cyano moiety ($-CN$). In another aspect of this embodiment $X_{aac}$ is a direct valence bond. In yet another aspect of this embodiment $R_{4ac}$ is H.

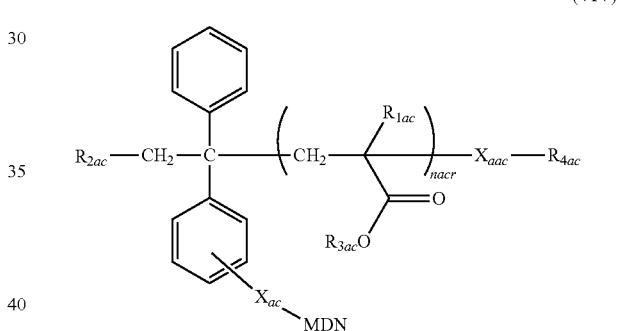

(VIV)

In another embodiment of said functional polymer, having structure (VIV) it has the more specific structure (VIVn3). In another aspect of this embodiment $X_{aac}$ is a direct valence bond. In yet another aspect of this embodiment $R_{4ac}$ is H.

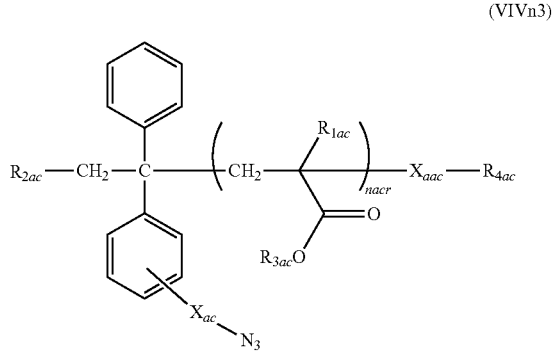

(VIVn3)

In another embodiment of said functional polymer, having structure (VIV) it has the more specific structure (VIVcn). In another aspect of this embodiment $X_{aac}$ is a direct valence bond. In yet another aspect of this embodiment $R_{4ac}$ is H.

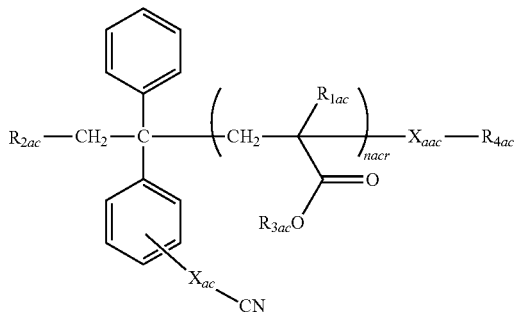

(VIVcn)

Another aspect of the novel functionalized polymers described herein is one having structure (VV); wherein nacr is the number of repeating units in the acrylic polymer segment; noac is the number of repeat units in the acrylic oligomeric segment and ranges from 1 to 10, $R_{1ac}$ is H or a C-1 to C-4 linear alkyl; $R_{2ac}$ is selected from a C-1 to C-8 linear alkyl, a C-3 to C-8 branched alkyl and a C-3 to C-8 cyclic alkyl; $R_{3ac}$ is selected from a C-1 to C-8 linear alkyl, a C-3 to C-8 branched alkyl and a C-3 to C-8 cyclic alkyl; and $R_{4ac}$ is selected from H, a C-1 to C-8 linear alkyl, a C-3 to C-8 branched alkyl, a C-3 to C-8 cyclic alkyl; and a dialkylsilyl moiety [($R_{siac}$)($R_{siaac}$)SiH—], wherein $R_{siac}$ and $R_{siaac}$ are independently selected from a C-1 to C-8 linear alkyl, a C-3 to C-8 branched alkyl and a C-3 to C-8 cyclic alkyl; $X_{ac}$ and $X_{aac}$ are independently selected from a direct valence bond, a C-1 to C-8 linear alkylene moiety, a C-3 to C-8 branched alkylene moiety, a C-3 to C-8 cyclic alkylene moiety, and a —$X_1$—O—$X_2$— (-alkyleneoxyalkylene-) moiety, wherein $X_1$ and $X_2$ are independently selected from a C-1 to C-8 linear alkylene, a C-3 to C-8 branched alkylene and a C-3 to C-8 cyclic alkylene; $R_{5ac}$ is H or a C-1 to C-4 linear alkyl; Rea is selected from a C-1 to C-8 linear alkyl, a C-3 to C-8 branched alkyl and a C-3 to C-8 cyclic alkyl; and MDN is an azide moiety (—$N_3$), or a cyano moiety (—CN). In another aspect of this embodiment $R_{4ac}$ is either a C-1 to C-8 linear alkyl, a C-3 to C-8 branched alkyl or a C-1 to C-8 cyclic alkyl In another embodiment $X_{aac}$ is a direct valence bond. In yet another aspect of this embodiment $R_{4ac}$ is H. In another aspect of this embodiment noac ranges from 1 to 6.

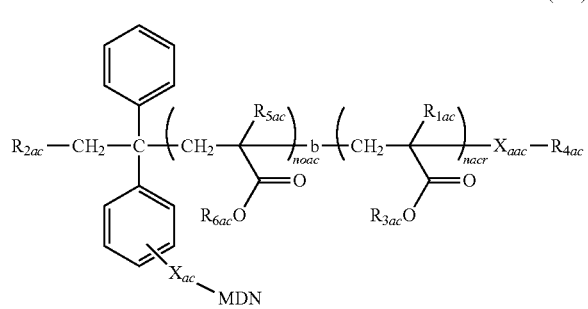

(VV)

In another embodiment of said functional polymer, having structure (VV) it has the more specific structure (VVn3). In another aspect of this embodiment $R_{4ac}$ is said dialkysilyl end group. In another aspect of this embodiment $R_{4ac}$ is either a C-1 to C-8 linear alkyl, a C-3 to C-8 branched alkyl or a C-1 to C-8 cyclic alkyl. In another embodiment $X_{aac}$ is a direct valence bond. In yet another aspect of this embodiment $R_{4ac}$ is H. In another aspect of this embodiment noac ranges from 1 to 6.

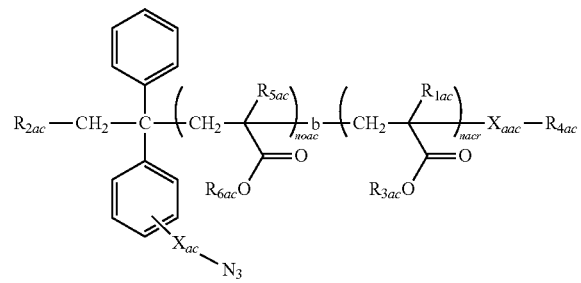

(VVn3)

In another embodiment of said functional polymer, having structure (VV) it has the more specific structure (VVcn). In another aspect of this embodiment $R_{4ac}$ is either a C-1 to C-8 linear alkyl, a C-3 to C-8 branched alkyl or a C-1 to C-8 cyclic alkyl. In another embodiment $X_{aac}$ is a direct valence bond. In yet another aspect of this embodiment $R_{4ac}$ is H. In another aspect of this embodiment noac ranges from 1 to 6.

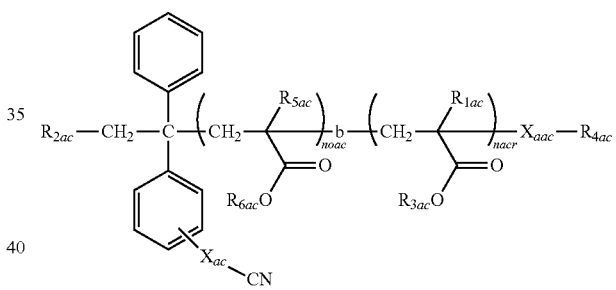

(VVcn)

Another aspect of the novel functionalized polymers described herein is one having structure structure (VVI); wherein nacr is the number of repeating units in the acrylic polymer segment; noca is the number of repeating units in the acrylic oligomer segment and ranges from 1 to 10; $R_{1ac}$ is H or a C-1 to C-4 linear alkyl; $R_{cna}$ is H or a C-1 to C-4 linear alkyl; $R_{2ac}$ is selected from a C-1 to C-8 linear alkyl, a C-3 to C-8 branched alkyl and a C-3 to C-8 cyclic alkyl; $R_{3ac}$ is selected from a C-1 to C-8 linear alkyl, a C-3 to C-8 branched alkyl, a C-3 to C-8 cyclic alkyl; $R_{dp}$ is H or a C-1 to C-4 linear alkyl; and $R_{4ac}$ is selected from H, a C-1 to C-8 linear alkyl, a C-3 to C-8 branched alkyl and a C-3 to C-8 cyclic alkyl; and a dialkylsilyl moiety [($R_{si}$)($R_{sia}$)SiH—] wherein $R_{si}$ and $R_{sia}$ are independently selected from a C-1 to C-8 linear alkyl, a C-3 to C-8 branched alkyl and a C-3 to C-8 cyclic alkyl; and $X_b$ is selected from a C-1 to C-8 linear alkylene, a C-3 to C-8 branched alkylene, a C-3 to C-8 cyclic alkylene and a —$X_{1a}$—O—$X_{2a}$— (-alkyleneoxyalkylene-) moiety wherein $X_1a$ and $X_{2a}$ are independently selected from a C-1 to C-8 linear alkylene, a C-3 to C-8 branched alkylene and a C-3 to C-8 cyclic alkylene; and MDN is an azide moiety (—$N_3$), or a cyano moiety (—CN). In another aspect of this embodiment $R_{4ac}$ is said dialkysilyl end group. In another aspect of this embodiment $R_{4ac}$ is either a C-1 to C-8 linear alkyl, a C-3 to C-8 branched alkyl or a C-1 to C-8 cyclic alkyl. In another embodiment $X_{aac}$ is a direct valence bond. In yet another aspect of this embodiment $R_{ac}$ is H. In another aspect of this embodiment noac ranges from 1 to 6.

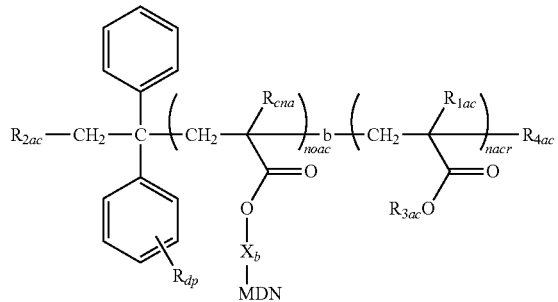

(VVI)

In another embodiment of said functional polymer, having structure (VVI) it has the more specific structure (VVIn3). In another aspect of this embodiment $R_{4ac}$ is said dialkysilyl end group. In another aspect of this embodiment $R_{4ac}$ is either a C-1 to C-8 linear alkyl, a C-3 to C-8 branched alkyl or a C-1 to C-8 cyclic alkyl. In another embodiment $X_{aac}$ is a direct valence bond. In yet another aspect of this embodiment $R_{4ac}$ is H. In another aspect of this embodiment noac ranges from 1 to 6.

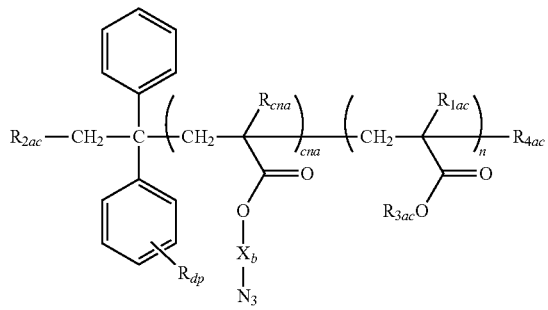

(VVIn3)

In another embodiment of said functional polymer, having structure (VVI) it has the more specific structure (VVIcn). In another aspect of this embodiment $R_{4ac}$ is said dialkysilyl end group. In another aspect of this embodiment $R_{4ac}$ is either a C-1 to C-8 linear alkyl, a C-3 to C-8 branched alkyl or a C-1 to C-8 cyclic alkyl. In another embodiment $X_{aac}$ is a direct valence bond. In yet another aspect of this embodiment $R_{4ac}$ is H. In another aspect of this embodiment noac ranges from 1 to 6.

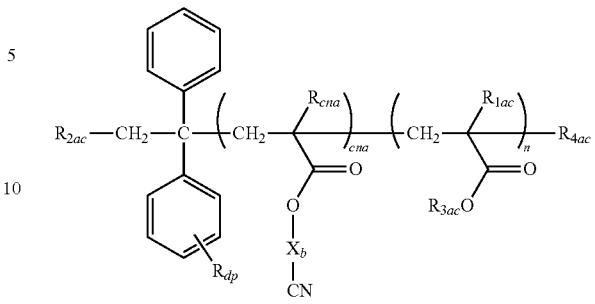

(VVIcn)

Another aspect of this invention is a novel composition, particularly a pinning layer composition comprising any one of the inventive functional polymers described herein, or a mixture of these with a spin casting organic solvent.

In one aspect this novel pinning layer composition, it is one comprising any one of the functional polymers described herein. These are chosen either from the functional styrenic polymers described herein or the functional acrylic polymers described herein.

In another aspect of this novel pinning layer composition it is one comprising at least two of the inventive functional polymers of the same type (a.k.a. either styrenic or acrylic) described herein. In one aspect of this embodiment, it is comprised of a mixture of two of the inventive functional polymers described herein.

The solid components of novel pinning layer composition described herein are mixed with a spin casting solvent which may be a single solvent or a mixture of different solvents. Examples of suitable solvents are the following spin casting solvents which may be used as a single solvent component or be combined to form a solvent which is a mixture of at least two solvents that dissolve the solid components of the composition.

The amount of inventive functional polymers described herein, either the functional styrenic or functional acrylic polymers, to be dissolved in the spin casting solvent to form the inventive neutral layer compositions ranges from about 0.2 wt % to about 2.0 wt % of the weight of the total solution. In another aspect of this invention this amount may range from about 0.3 wt % to about 1.0 wt % of the weight of the total solution.

Suitable spin casting solvents may include, for example, a glycol ether derivative such as ethyl cellosolve, methyl cellosolve, propylene glycol monomethyl ether (PGME), diethylene glycol monomethyl ether, diethylene glycol monoethyl ether, dipropylene glycol dimethyl ether, propylene glycol n-propyl ether, or diethylene glycol dimethyl ether; a glycol ether ester derivative such as ethyl cellosolve acetate, methyl cellosolve acetate, or propylene glycol monomethyl ether acetate (PGMEA); carboxylates such as ethyl acetate, n-butyl acetate and amyl acetate; carboxylates of di-basic acids such as diethyloxylate and diethylmalonate; dicarboxylates of glycols such as ethylene glycol diacetate and propylene glycol diacetate; and hydroxy carboxylates such as methyl lactate, ethyl lactate (EL), ethyl glycolate, and ethyl-3-hydroxy propionate; a ketone ester such as methyl pyruvate or ethyl pyruvate; an alkoxycarboxylic acid ester such as methyl 3-methoxypropionate, ethyl 3-ethoxy-propionate, ethyl 2-hydroxy-2-methylpropionate, or methylethoxypropionate; a ketone derivative such as methyl ethyl ketone, acetyl acetone, cyclopentanone, cyclohexanone or 2-heptanone; a ketone ether derivative such as diacetone alcohol methyl ether; a ketone alcohol derivative such as acetol or diacetone alcohol; a ketal or acetal like 1,3 dioxalane and diethoxypropane; lactones such as butyrolactone; an amide derivative such as dimethylacetamide or dimethylfornamide, anisole, and mixtures thereof.

Additionally, the novel pinning layer composition may further comprise additives such as surfactants.

The novel pinning layer composition is coated on a substrate and heated to remove the spin casting solvent and crosslink and/or graft the film. Typical film thickness ranges from about 3 nm to about 50 nm after heating, or about 3 nm to about 30 nm, or about 4 nm to about 20 nm, or about 5 nm to about 20 nm, or about 10 nm to about 20 nm. The film can be heated at temperatures ranging from about 180° C. to about 350° C., or from about 200° C. to about 300° C. Once the crosslinked film has been formed the coating may be used for further processing to finally form a pattern using self-assembly.

The block copolymer for use in self-assembly in conjunction with the novel pinning layer composition can be any block copolymers which can form domains through self-assembly. The microdomains are formed by blocks of the same type which tend to self-associate. Typically, block copolymer employed for this purpose are polymers in which the repeat units derived from monomers are arranged in blocks which are different compositionally, structurally or both and are capable of phase separating and forming domains. The blocks have differing properties which can be used to remove one block while keeping the other block intact on the surface, thus providing a pattern on the surface. Thus, the block may be selectively removed by plasma etching, solvent etching, developer etching using aqueous alkaline solution, etc. In block copolymers based on organic monomers, one block can be made from polyolefinic monomers including polydienes, polyethers including poly(alkylene oxides) such as poly(ethylene oxide), poly(propylene oxide), poly(butylene oxide) or mixtures thereof; and, the other block can be made from different monomers including poly((meth)acrylates), polystyrenes, polyesters, polyorganosiloxanes, polyorganogermanes, and or mixtures thereof. These blocks in a polymer chain can each comprise one or more repeat units derived from monomers. Depending on the type of pattern needed and methods used different types of block copolymers may be used. For instance, these may consist of diblock copolymers, triblock copolymers, terpolymers, or multiblock copolymers.

The blocks of these block copolymers may themselves consist of homopolymers or copolymers. Block copolymers of different types may also be employed for self-assembly, such as dendritic block copolymers, hyperbranched block copolymers, graft block copolymers, organic diblock copolymers, organoic multiblock copolymers, linear block copolymers, star block copolymers amphiphilic inorganic block copolymers, amphiphilic organic block copolymers or a mixture consisting of at least block copolymers of different types.

The blocks of organic block copolymer may comprise repeat units derived from monomers such as $C_{2-30}$ olefins, (meth)acrylate monomers derived from $C_{1-30}$ alcohols, inorganic-containing monomers including those based on Si, Ge, Ti, Fe, Al. Monomers based on $C_{2-30}$ olefins can make up a block of high etch resistance alone or do so in combination with one other olefinic monomer. Specific example of olefinic monomers of this type are ethylene, propylene, 1-butene, 1,3-butadiene, isoprene, dihydropyran, norbornene, maleic anhydride, styrene, 4-hydroxy styrene, 4-acetoxy styrene, 4-methylstyrene, alpha-methylstyrene or mixtures thereof. Examples of highly etchable units can be derived from (meth)acrylate monomers such as (meth)acrylate, methyl (meth)acrylate, ethyl (meth)acrylate, n-propyl (meth)acrylate, isopropyl (meth)acrylate, n-butyl (meth) acrylate, isobutyl (meth)acrylate, n-pentyl (meth)acrylate, isopentyl (meth)acrylate, neopentyl (meth)acrylate, n-hexyl (meth)acrylate, cyclohexyl (meth)acrylate, isobornyl (meth) acrylate, hydroxyethyl (meth)acrylate or mixtures thereof.

An illustrative example of a block copolymer containing one type of high etch resistant repeat unit would be a polystyrene block containing only repeat units derived from styrene and another type of highly etchable polymethylmethacrylate block containing only repeat units derived from methyl methacrylate. These together would form the block copolymer poly(styrene-b-methylmethacrylate), where b refers to block.

Specific non-limiting examples of block copolymers that are useful for graphoepitaxy, chemoepitaxy or pinned chemoepitaxy as used for directed self-assembly on a patterned neutral layer, are poly(styrene-b-vinyl pyridine), poly (styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl (meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(methyl methacrylate-b-dimethylsiloxane), or a combination comprising at least one of the above described block copolymers. All these polymeric materials share in common the presence of at least one block which is rich in repeat units resistant to etching techniques typically employed in manufacturing IC devices and at least one block which etches rapidly under these same conditions. This allows for the self-assembled polymer to pattern transfer onto the substrate.

Typically, the block copolymers suitable for have a weight-averaged molecular weight ($M_w$) in the range of about 30,000 g/mole to about 500,000 g/mol and a polydispersity (PDI) ($M_w/M_n$) of about 1.01 to about 6, or 1.01 to about 2 or 1.01 to about 1.5. Molecular weight, and PDI can be determined by, for example, gel permeation chromatography using a universal calibration method, calibrated to polystyrene standards. This ensures that the polymer blocks have enough mobility to undergo self-assembly when applied to a given surface either spontaneously, or by using a purely thermal treatment, or through a thermal process which is assisted by the absorption of solvent vapor into the polymer framework to increase flow of segments enabling self-assembly to occur.

Solvents suitable for dissolving block copolymers for forming a film can vary with the solubility requirements of the block copolymer. Examples of solvents for the block copolymer assembly include propylene glycol monomethyl ether acetate (PGMEA), ethoxyethyl propionate, anisole, ethyl lactate, 2-heptanone, cyclohexanone, amyl acetate, n-butyl acetate, n-amyl ketone (MAK), gamma-butyrolactone (GBL), toluene, and the like. In an embodiment, specifically useful casting solvents include propylene glycol monomethyl ether acetate (PGMEA), gamma-butyrolactone (GBL), or a combination of these solvents.

The block copolymer composition can comprise additional components and/or additives selected from the group consisting of: inorganic-containing polymers; additives including small molecules, inorganic-containing molecules, surfactants, photoacid generators, thermal acid generators, quenchers, hardeners, crosslinkers, chain extenders, and the like; and combinations comprising at least one of the foregoing, wherein one or more of the additional components and/or additives co-assemble with the block copolymer to form the block copolymer assembly.

The block copolymer composition (containing highly etchable and etch resistant blocks) is applied onto a cross-linked coating of the inventive random copolymer overlying a substrate to form an overlying block copolymer film. This block copolymer film may be formed from solutions as described above. Upon application and solvent removal, the block copolymer, film upon annealing then undergoes self-assembly. The type of self-assembled pattern formed is predicated, as described herein, by careful tuning of the composition of the inventive random copolymer and the composition of the overlying block copolymer.

More specifically, the application of these block copolymer compositions may be done using known coating techniques, such as spinning techniques (including spin drying).

The neutral layer which may be use in self-assembly in conjunction with the novel pinning layer composition can be any neutral layers characterized in that they do not have a preferential affinity for either of the blocks in a block copolymer. Accordingly, a neutral layer may, without limitation, comprise the same monomer repeat units as the block copolymer but randomized or synthesized in such a way that the monomers are approximately uniformly distributed across the polymer chains. For example, instead of random chains it may be desirable to use alternating polymers in which monomer A alternates with monomer B in the polymer chain. Neutral layers may be functionalized polymer brushes, cross-linkable polymers, random copolymers having similar repeat units to those used in the block copolymer being used or blends of homopolymers, each respectively having similar monomers to those in the block copolymer being used.

Producing polymer neutral layers in which the monomers are at least approximately uniformly distributed may be accomplished in several ways. For example, if free radical polymerization is used, it may be desirable to feed the individual monomers to the reaction vessel in such a way as to account for their individual reactivities. Without intending to be bound by theory, it may be desirable to feed a monomer, A, that is relatively more reactive with other A monomers into the reaction vessel more slowly such that the reaction is effectively "starved" of A throughout the reaction. This allows reaction of monomer A with another monomer, B, before more A is introduced. Other polymerization methods may be useful in producing polymers in which the distribution across the polymer chain is approximately uniform. Non limiting examples of such methods include living free radical polymerization, anionic polymerization, cationic polymerization, condensation polymerization, plasma polymerization, metal catalyzed polymerization including metallocene polymerization, metathesis polymerization, and the like.

Neutral layers may also include monomers and additives for crosslinking. Such materials may include, without limitation, aminoplast crosslinkers such as melamines and glycolurils, epoxy and oxetane resins, urethane resins, formaldehyde resins, cage amine materials such as hexamethylene tetramine, polyols, and the like.

Polymers suitable for neutral layers will depend on the particular block copolymer chosen. However, neutral layer materials may comprise monomer repeat units that comprise, without limitation styrene, 4-vinyl-1,2-dihydrocyclobutabenzene, 4-vinyl pyridine, butadiene, isoprene, methyl (meth)acrylate, polyethylene oxide, polyethylene-propylene, polycaprolactone, polycaprolactam, poly-t-butyl (meth) acrylate, propylene oxide, tetrahydropyran, dimethylsiloxane, maleic anhydride, itaconic anhydride, maleimide, maleic acid, itaconic acid, caproic acid, lactic acid, glycine, ethylene, propylene, 1-butene, 1,3-butadiene, norbornene, 4-hydroxy styrene, 4-acetoxy styrene, 4-methylstyrene, alpha-methylstyrene, ethyl (meth)acrylate, n-propyl (meth) acrylate, isopropyl (meth)acrylate, n-butyl (meth)acrylate, isobutyl (meth)acrylate, n-pentyl (meth)acrylate, neopentyl (meth)acrylate, n-hexyl (meth)acrylate, cyclohexyl (meth) acrylate, isobornyl (meth)acrylate, hydroxyethyl (meth) acrylate or a copolymer comprising at least one of the above.

Further, without limitation, copolymers used as neutral layers may comprise poly(methyl methacrylate-styrene) poly(butadiene-butylmethacrylate), poly(butadiene-dimethylsiloxane), poly(butadiene-methylmethacrylate), poly (butadiene-vinylpyridine), poly(isoprene-methylmethacrylate), (polyisoprene-vinylpyridine), poly(butylacrylate-methylmethacrylate), poly(butylacrylate-vinylpyridine), (polyhexylacrylate-vinylpyridine), poly(isobutylene-butylmethacrylate), poly(isobutylene-dimethoxysiloxane), poly (isobutylene-methylmethacrylate), poly(isobutylene-vinylpyridine), poly(isoprene-ethyleneoxide), poly (butylmethacrylate-butylacrylate), poly(butylmethacrylate-vinylpyridine), poly(ethylene-methylmethacrylate), poly (methylmethacrylate-butylacrylate), poly (methylmethacrylate-butylmethacrylate), poly(styrene-butadiene), poly(styrene-butylacrylate), poly(styrene-butylmethacrylate), poly(styrene-butylstyrene), poly (styrene-dimethoxysiloxane), poly(styrene-isoprene), poly (styrene-methylmethacrylate), poly(styrene-vinylpyridine), poly(ethylene-vinylpyridine), poly(vinylpyridine-methylmethacrylate), poly(ethyleneoxide-isoprene), poly(ethyleneoxide-butadiene), poly(ethyleneoxide-styrene), or poly(ethyleneoxide-methylmethacrylate).

Further and without limitation, neutral layers may have non functionalized chain ends or may be telechelic polymers with functionalized chain ends wherein the functional group(s) at the end of the polymer chain may be, without limitation, chosen from an alcohol group, an ester group, a carbonate group, a carboxylic acid group, a phosphonic acid group, a sulfonic acid group, an amine group, an amide or imide group, an epoxy group, a silyl group, an alkoxysilyl group, an alkylsilyl group, an aminosilane group, an isocyanate group, a thiocyanate group, or an isothiocyanate group.

One aspect of this invention is an inventive process of coating a pinning layer comprising the step of
  i) coating any one of the inventive functional styrenic polymer containing compositions described herein on a substrate which contains only metallic surfaces, or which contains a mixture of metallic and non-metallic surfaces forming a coating on said substrate.

In one aspect of the above inventive process comprising step i) said substrate is a substrate containing only metallic surfaces. In another aspect of this embodiment the metallic surface may is selected for at least one of a Cu, W, Mo, Al, Zr, Ti, Hf, Ag and Au surfaces. In another embodiment is may be selected from Cu, W, Mo, Al, Zr, Ti, and Hf.

In another aspect of inventive process comprising step i) said substrate is one which is patterned and contains both metallic and non-metallic surfaces. In one more specific embodiment of this aspect the metallic surface may be selected from the group consisting of Cu, W, Mo, Al, Zr, Ti, and Hf surfaces.

In the inventive process comprising step i) wherein said substrate is one which contains both metallic and non-metallic surfaces it is wherein the non-metallic surface is a semiconductor. In one more specific embodiment of this aspect the metallic surface may be selected from the group consisting of Cu, W, Mo, Al, Zr, Ti, and Hf surfaces.

In the inventive process comprising step i) wherein said substrate is one which contains both metallic and non-metallic surfaces selected from the group consisting of
- a substrate having metallic surfaces and Si surfaces,
- a substrate having metallic surfaces and GaAs surfaces,
- a substrate having metallic surfaces and Ge surfaces,
- a substrate having metallic and silicon oxide surfaces,
- a substrate having metallic and silicon nitride surfaces,
- a substrate having metallic and silicon oxynitride surfaces,
- a substrate having metallic and neutral layer surfaces,
- a substrate having metallic and photoresist surfaces, and
- a substrate having metallic and spin on carbon surfaces.

In a more specific example of this embodiment the metallic surface may be selected from the group consisting Cu, W, Mo, Al, Zr, Ti, I-If, Ag, and Au. In a more specific example of this embodiment the metallic surface may be selected from the group consisting Cu, W, Mo, Al, Zr, Ti, and Hf. In another more specific example of this embodiment the non-metallic substrate is selected from Si, and $SiO_2$, and a mixture of these two types of surfaces.

In another embodiment said above inventive process comprising step i) wherein said substrate is one which contains both metallic and non-metallic surfaces, additionally it may comprise additional step ii) and iii) as follows:
- ii) baking said coating to form a baked coating,
- iii) rinsing said baked coating, with an organic solvent, leaving a brush film attached to the metallic surface.

In one aspect of this embodiment the substrate is one which only has metallic surfaces to which the film attaches. In another aspect of this embodiment said substrate is one which contains both metallic and non-metallic surfaces. In this embodiment said metallic surfaces, or non-metallic surfaces may be any one of these types of surfaces described above. In this embodiment said organic solvent may be any organic solvent described as suitable herein for the inventive composition.

In another embodiment of said above inventive processes comprising step i) it is one wherein said substrate is a patterned semiconductor substrate whose pattern is comprised of metallic and non-metallic surfaces and it additionally comprises step ii') and iii') as follows:
- ii') baking said coating to form a baked coating,
- iii') rinsing said baked coating, with an organic solvent, leaving a brush film attached to metal surfaces in the patterned substrate. In this embodiment said metallic surfaces, or non-metallic surfaces may be any one of these types of surfaces described above. In this embodiment said organic solvent may be any organic solvent described as suitable herein for the inventive composition.

Another aspect of this invention an inventive process of selectively applying a pinning layer on the metallic surfaces of a patterned metal layer present a patterned inorganic semiconductor substrate which also contains non-metallic surfaces as follows:
- ia) coating any one of the novel compositions described herein on said inorganic semiconductor substrate, forming a coating,
- iia) baking said coating to form a baked coating,
- iiia) rinsing said baked coating, leaving a brush layer selectively attached to said metal portions.

In one aspect of steps i), i') or ia), said metallic surfaces may be selected from Cu, W, Mo, Al, Zr, Ti, Hf, Ag, Au surfaces and the like. In another aspect of this embodiment said inorganic semiconductor substrate may be selected from Si, GaAs, Ge and the like. In these substrates said non-metallic surfaces may be selected from a surface originating from said inorganic semiconductor, any from other non-metallic surface as described herein or a mixture of these non-metallic surfaces which is present on said patterned inorganic semiconductor substrate. In one embodiment said non-metallic surfaces are either Si, $SiO_2$ or a mixture of Si and $SiO_2$.

In one aspect of this invention, said selectively attached pinning layer formed from compositions comprising the novel functional styrenic polymer may be used in a directed self-assembly process as follows:
- ib) coating any one any one of the novel compositions described herein on a substrate containing both metallic surfaces and non-metallic neutral layer surfaces,
- iib) baking said coating to form a baked coating,
- iiib) rinsing said baked coating, leaving a brush layer selectively attached to said metal surfaces, forming a patterned pinning layer,
- ivb) coating a block copolymer layer on top of said patterned pinning layer,
- vb) forming a directed self-assembly film of the overlying block copolymer
- vib) etching said directed self-assembled block copolymer forming a pattern in said substrate.

In one aspect of steps ii), ii'), iia), iib) the baking step is done at a temperature which may be chosen from about 190° C. to about 250° C. In another aspect of this embodiment the temperature may be chosen from about 200° C. to about 240° C. In another aspect of this embodiment the temperature may be chosen from about 210° C. to about 240° C. In yet another aspect of this embodiment the temperature may be chosen from about 220° C. to about 240° C. In this embodiment the above described baking step may be done for a time ranging from about 1 minute to about 10 minutes. In another aspect said time may range from about 2 minutes to about 8 minutes. In another aspect said time may range from about 3 minutes to about 7 minutes. In yet another embodiment said time may range from about 4 minutes to about 6 minutes.

In one aspect of steps iii), iii'), iiia), or iiib) said rinsing is done for a time of about 1 minute to about 5 minutes. In another embodiment said time is from about 1 minute to about 4 minutes. In yet another embodiment said time is from about 1 minute to about 3 minutes. In another aspect of this embodiment said rinsing is done with an organic solvent. In another aspect of this embodiment said rinsing is done with an organic spin casting solvent. Suitable spin casting solvents may include, for example, a glycol ether derivative such as ethyl cellosolve, methyl cellosolve, propylene glycol monomethyl ether (PGME), diethylene glycol monomethyl ether, diethylene glycol monoethyl ether, dipropylene glycol dimethyl ether, propylene glycol n-propyl ether, or diethylene glycol dimethyl ether; a glycol ether ester derivative such as ethyl cellosolve acetate, methyl cellosolve acetate, or propylene glycol monomethyl ether acetate (PGMEA); carboxylates such as ethyl acetate, n-butyl acetate and amyl acetate; carboxylates of di-basic acids such as diethyloxylate and diethylmalonate; dicarboxylates of glycols such as ethylene glycol diacetate and propylene glycol diacetate; and hydroxy carboxylates such as methyl lactate, ethyl lactate (EL), ethyl glycolate, and ethyl-3-hydroxy propionate; a ketone ester such as methyl pyruvate or ethyl pyruvate; an alkoxycarboxylic acid ester such as methyl 3-methoxypropionate, ethyl 3-ethoxypropionate, ethyl 2-hydroxy-2-methylpropionate, or methyl-ethoxypropionate; a ketone derivative such as methyl ethyl ketone, acetyl acetone, cyclopentanone, cyclohexanone or 2-heptanone; a ketone ether derivative such as diacetone alcohol methyl ether; a ketone alcohol derivative such as acetol or diacetone alcohol; a ketal or acetal like 1,3 dioxalane and diethoxypropane; lactones such as butyrolactone; an amide derivative such as dimethylacetamide or dimethylformamide, anisole, and mixtures thereof.

In set step ivb) block copolymers suitable for directed self-assembly are ones capable of microphase separation and comprising a block rich in carbon (such as styrene or containing some other element like Si, Ge, and Ti) which is resistant to plasma etch, and a block which is highly plasma etchable or removable, which can provide a high resolution pattern definition. Examples of highly etchable blocks can comprise monomers which are rich in oxygen and which do not contain refractory elements and are capable of forming blocks which are highly etchable, such as methyl methacrylate.

In step vb) the directed self-assembly of the block copolymer coating may be accomplished by heating alone at a high temperature (e.g. 200 to 300° C.) or heating at a temperature lower than this by plasticizing the block copolymer with a solvent vapor.

In step vib) the etching of the self-assembled block copolymer coating into the substrate may be accomplished by plasma etch gases used in processes to make integrated circuits (IC). In this manner very fine patterns can be created on typical IC substrates.

Another aspect of this invention pertains a composition comprising the inventive functional acrylic polymer described above with a spin casting solvent. This composition may be prepared in the same manner as described above for the inventive functional styrenic polymer described above.

Another aspect of this invention is coating the composition comprising the inventive functional acrylic polymer to form a pinning layer comprising the step of ic) coating a composition containing a functional acrylic polymer as described herein, on a substrate which contains only metallic surfaces, or which contains a mixture of metallic and non-metallic surfaces forming a coating on said substrate. In another aspect of this process said substrate is one which contains both metallic and non-metallic surfaces selected from the group consisting of a substrate having metallic surfaces and Si surfaces, a substrate having metallic surfaces and GaAs surfaces, a substrate having metallic surfaces and Ge surfaces, a substrate having metallic and silicon oxide surfaces, a substrate having metallic and silicon nitride surfaces, a substrate having metallic and silicon oxynitride surfaces, a substrate having metallic and neutral layer surfaces, a substrate having metallic and photoresist surfaces, and a substrate having metallic and spin on carbon surfaces.

Another aspect of this invention is one in which the above processes comprising step ic) comprise additional step iic) and iiic):

iic) baking said coating to form a baked coating,
iiic) rinsing said baked coating, with an organic solvent, leaving a brush film attached to the metallic surface.

Another aspect of this invention is one in which the above processes comprising step ic) is one wherein said non-metallic surfaces, are Si surfaces, $SiO_2$ surfaces or a mixture of these two types of surfaces.

Another aspect of this invention is one in which the above processes comprising step i) is one wherein said wherein said metallic surfaces are surfaces which are selected for at least one of a Cu, W, Mo, Al, Zr, Ti, Hf, Ag and Au surfaces.

Another aspect of this invention is the process of forming a patterned substrate by directed self-assembly comprising steps id) to vid), which employs a composition as described herein containing the inventive functional acrylic polymer as follow:

id) coating the composition of claim 14 described herein on a substrate containing both metallic surfaces and non-metallic neutral layer surfaces, iid) baking said coating to form a baked coating, iiid) rinsing said baked coating, leaving a brush layer selectively attached to said metal surfaces, forming a patterned pinning layer, ivd) coating a block copolymer layer on top of said patterned pinning layer, vd) forming a directed self-assembly film of the overlying block copolymer vid) etching said directed self-assembled block copolymer forming a pattern in said substrate.

For the above processes employing the composition employing the inventive functional acrylic polymer, the more detailed processing conditions (e.g. baking temperature conditions, more specific substrates, patterned substrates and the like) are the same as previously described above in the processing steps for the compositions containing the inventive functional styrenic polymer [a.k.a. i) to iii), i') to iii'), ia) to iiia), ib) to ivb)] as described in the preceding paragraphs.

EXAMPLES

Reference will now be made to more specific embodiments of the present disclosure and experimental results that provide support for such embodiments. However, Applicants note that the disclosure below is for illustrative purposes only and is not intended to limit the scope of the claimed subject matter in any way.

Chemicals

All chemicals unless otherwise indicated were purchased from Sigma Aldrich (3050 Spruce St., St. Louis, MO 63103).

All synthetic experiments were carried out under $N_2$ atmosphere. Lithographic experiments were carried out as described in the text. The molecular weight of the copolymers was measured with a Gel Permeation Chromatography equipped with refractive index and UV detector with five PSS SDV columns (pore sizes 100 A, 500 A, 1000 A, 10,000 A and 100,000 A). THF was used a mobile phase at a flow rate of 1 mL/min.

Lithographic Experiments were done using a TEL Clean ACT8 track. SEM pictures were taken with a applied Materials NanoSEM_3D Scanning electron microscope picture are shown at 1Fov magnification or 2Fov magnification.

Scheme 1 shows the synthesis pathway which was used to obtain the BenzylAzide terminated polystyrene as described in Example 1:

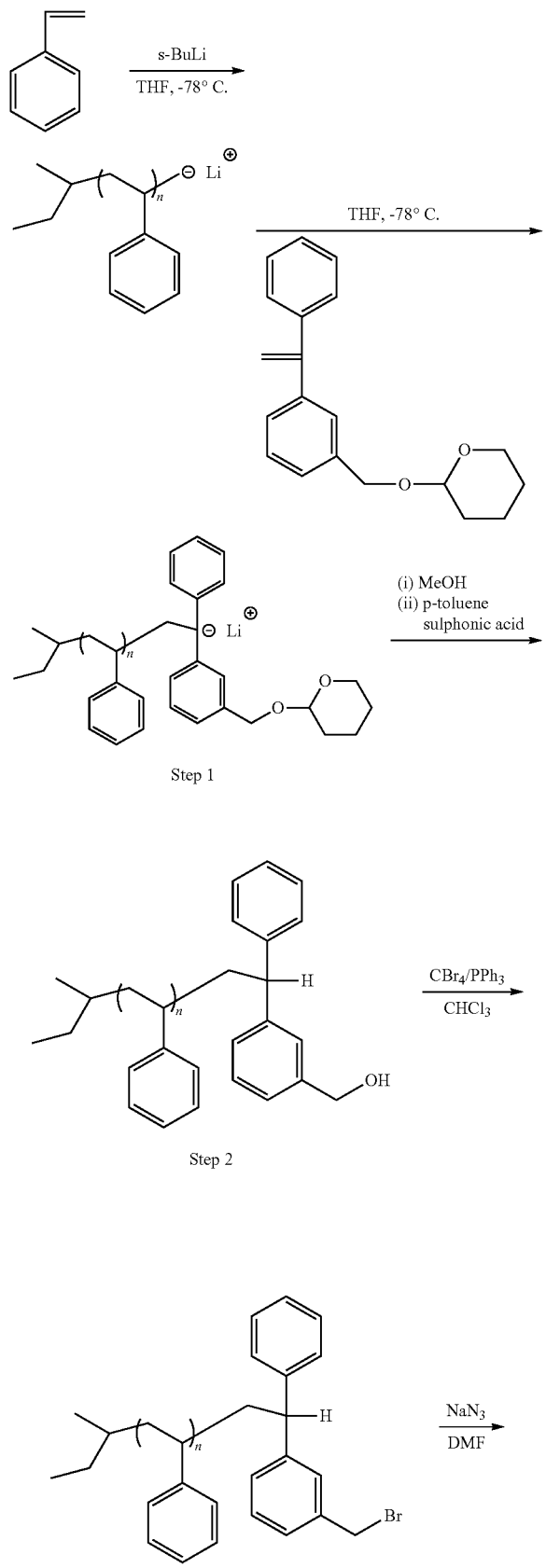

Scheme 1: Synthesis of azide terminated polystyrene

Step 1

Step 2

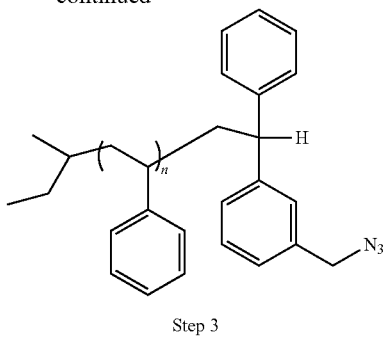

Step 3

Example 1. Synthesis of BenzylAzide Terminated Polystyrene

Step 1: ~55 mL of Styrene (column passed and degassed) was taken into a calibrated ampule provided with two Rota flow stopcocks and 19F connecting glass joint. After careful degassing under dynamic vacuum while Styrene kept at low temperature, the 55 mL styrene (S) monomer was collected, and ampule was closed under vacuum with stopcock. In the glovebox, 3.9 g of 3-benzyltetrahydrofuran-diphenylethylene (DPE) was weighed (1.2 molar excess with respect to Sec-BuLi) in a vial and dissolved in ~5-10 mL toluene and transferred in a calibrated ampule provided with single Rota flow-stopcock and 19F joint. This solution was promptly titrated with dilute hexylDPE-Li solution until a pale orange/red color was persistence. After closing the stopcock ampule was removed from glovebox. Both Styrene ampule and DPE ampule were attached to the flaks using glass joints and yellow grease. Vacuum was applied to the flask and dried using heat-gun. After 10 min flask was brought to RT and filled with argon. Under positive pressure ~600 mL dry THF was transferred to the flask via cannula transfer. Flask temperature was lowered to −78° C. using dry ice/acetone bath. THF solution was titrated with Sec-BuLi (1.4M) until a persistent lemon yellow/yellow color was obtained. While flask at −78° C., Styrene ampule was filled with argon, and pressure equilibrating stopcock was closed. After 5 min dry ice/acetone bath was removed and flask was brought to RT. It takes 15-30 min for the decay or yellow color/sec-BuLi (complete decay of excess Sec-BuLi was). After a colorless solution was obtained, flask temperature was lowered to −78° C. and 7.9 mL of sec-BuLi (1.4M) initiator was added using airtight glass syringe. After 2-3 min, while initiator solution kept under rapid stirring and Styrene was added dropwise within 3-6 min. Reaction was continued further for 30 minutes. Then 3.9 g of 3-benzyltetrahydrofuran-diphenylethylene was added from the ampule, the deep red color formed immediately indicates the living anion of DPE moiety. After 1 minutes the reaction mixture was terminated with 3 mL degassed methanol. Flask was brought to RT and then 400 mL methanol was added followed by the addition of 10 g p-toluenesulphonic acid. The reaction mixture was stirred over night at RT. The polymer was recovered by precipitation in 5 L of isopropanol (IPA). Precipitated polymer was filtered and dried in vacuum at 80° C. and gave quantitative yield of 3-benzylhydoxy-diphenylethylene end-capped PS. The yield of hydroxy terminated PS with $M_n$=~5K, PDI=<1.1 and functionality by NMR is 99%.

Step 2: in a 1 L round bottom flask, 40 g of hydroxy terminated PS was dissolved using 400 mL of chloroform. Add 6.5 g of triphenylphosphine and 8 g of tetrabromomethane to the reactor then stir it overnight at RT. The polymer was recovered by precipitation in 4 L of IPA. Precipitated polymer was filtered and dried in vacuum at 80° C. and gave quantitative yield of 3-benzylbromo-diphenylethylene end capped PS. The yield of benzylbromo terminated PS with $M_n$=~5K, PDI=<1.1 and functionality by NMR is 98%.

Step 3: in a 1 L round bottom flask, 40 g of benzylbromo terminated PS was dissolved using 400 mL of DMF. 1.7 g of $NaN_3$ was then added to the reactor. The reaction mixture was then stirred over night at 60° C. The polymer was recovered by precipitation in 4 L of IPA. Precipitated polymer was filtered and dried in vacuum at 80° C. and gave quantitative yield of 3-benzylazido-diphenylethylene end-capped PS. The yield of benzylazido terminated PS with $M_n$=~5K, PDI=<1.1 and functionality by NMR is 95%.

Example 2. Synthesis of Benzyl Azide Terminated Polymethylmethacrylate

Synthesis procedure is similar to Example 1 (Ex 1). Briefly, methyl methacrylate (MMA) was polymerized using the adduct of sec-BuLi (7.9 mL, 1.4M) and benzyltetrahydrofuran-diphenylethylene (1.2 molar excess with respect to Sec-BuLi) initiator. Methyl methacrylate was then added from the ampule and the reaction was continued for 20 minutes at −78° C. The reaction mixture was terminated with 3 mL degassed methanol. Flask was brought to RT and then 400 mL methanol was added followed by the addition of 10 g p-toluenesulphonic acid. The reaction mixture was stirred over night at RT. The polymer was recovered by precipitation in 5 L of isopropanol (IPA). Precipitated polymer was filtered and dried in vacuum at 70° C. and gave quantitative yield of 3-benzylhydoxy-diphenylethylene end capped PMMA. The yield of hydroxy terminated PMMA with $M_n$=~5.4K, PDI=<1.12 and functionality by NMR is 95%.

Bromination and azidation reaction were performed using the similar procedure described in example 1, Step 2 and step 3.

Scheme 2

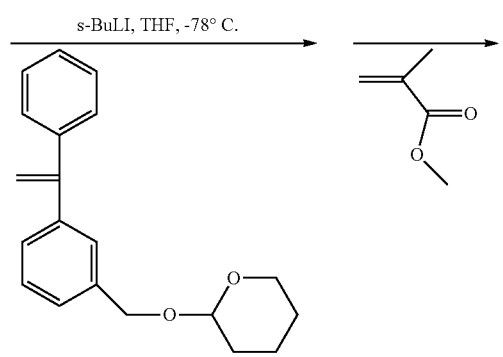

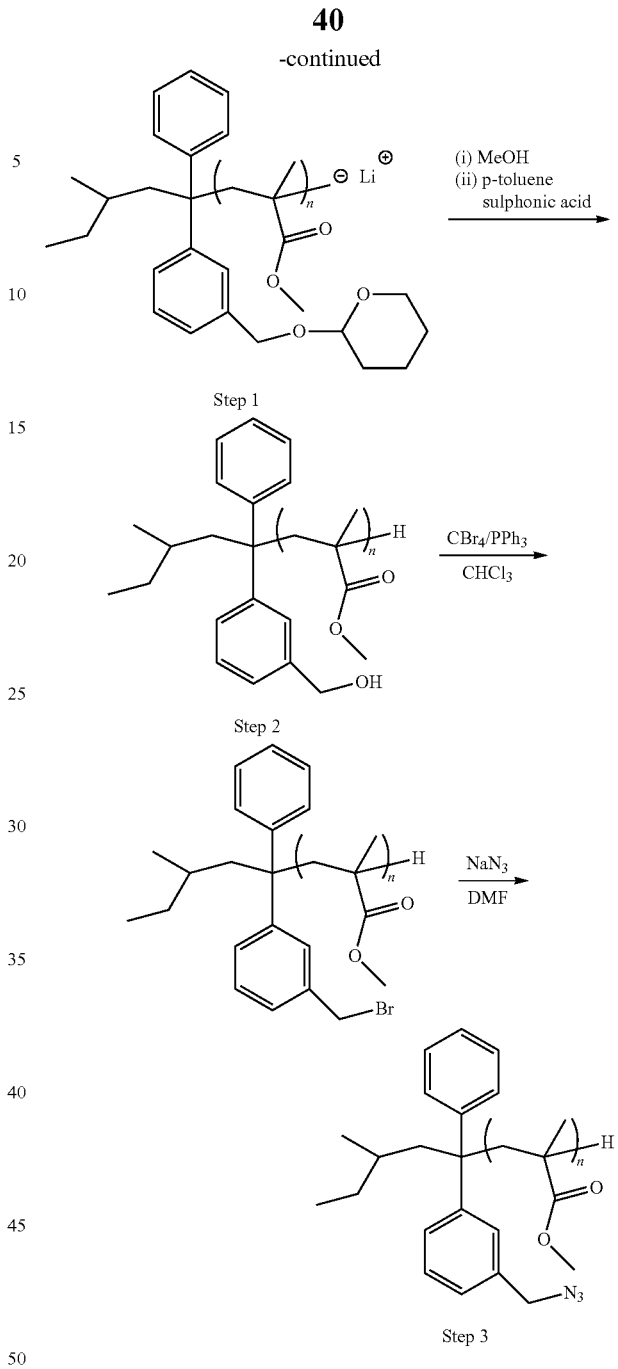

Example 3 (Ex 3). Synthesis of Multi-BenzylAzide Terminated Polystyrene

Synthesis procedure is similar to Example 1 (Ex 1). Briefly, styrene was polymerized using 7.9 mL of sec-BuLi (1.4M) initiator. Then a mixture of 3-benzyltetrahydrofuran-diphenylethylene and styrene (2:1) was added from the ampule, the deep red color formed immediately indicates the living anion of DPE moiety. After 5 minutes the reaction mixture was terminated with 3 mL degassed methanol. Flask was brought to RT and then 400 mL methanol was added followed by the addition of 10 g p-toluenesulphonic acid. The reaction mixture was stirred over night at RT. The polymer was recovered by precipitation in 5 L of isopropanol (IPA). Precipitated polymer was filtered and dried in vacuum at 80° C. and gave quantitative yield of multi 3-benzylhydoxy-diphenylethylene end capped PS. The yield of hydroxy terminated PS with $M_n$=~4.8K, PDI=<1.12 and functionality by NMR is 95%.

Bromination and azidation reaction were performed using the similar procedure described in example 1, Step 2 and step 3.

Example 4 (Ex 4). Synthesis of Hydrosilane-Benzylazide Terminated Polystyrene Typical synthesis procedure is similar to Example 1. Briefly, styrene was polymerized using 7.9 mL of sec-BuLi (1.4M) initiator. Then 3.9 g of 3-benzyltetrahydrofuran-diphenylethylene was added from the ampule, the deep red color formed immediately indicates the living anion of DPE moiety. After 5 minutes the reaction mixture was terminated with 3 mL distilled chlorodimethyl silane. Flask was brought to RT and then 400 mL methanol was added followed by the addition of 10 g p-toluenesulphonic acid. The reaction mixture was stirred over night at RT. The polymer was recovered by precipitation in 5 L of isopropanol (IPA). Precipitated polymer was filtered and dried in vacuum at 80° C. and gave quantitative yield of multi 3-benzylhydoxy-diphenylethylene and hydrosilane end capped PS. The yield of hydroxy terminated PS with $M_n$=~5.4K, PDI=<1.11 and functionality by NMR is 93%. Bromination and azidation reaction were performed using the similar procedure described in example 1, Step 2 and step 3.

Example 5 (Ex 5). Synthesis of Alkylazide Terminated Polystyrene

~55 mL of Styrene (column passed and degassed) was taken into a 1 L round bottom flusk with magnetic stirrer with two Rota flow stopcocks and 19F connecting glass joint. 500 mL of anhydrous cyclohexane was then added to the reactor via cannula transfer. 7.9 mL of s-BuLi (1.4M) was added to the reactor using dry glass syringe and continue the reaction for 30 minutes at room temperature. After 30 minutes 2 mL of ethylene oxide was added to the living polymer. The living polymer was terminated by 3 mL of degassed methanol. The resulted polymer solution was then precipitated in 4 L of IPA, filtered and dry for characterization. The yield of the hydroxy terminated PS was over 95% with Mn=~5K and PDI=<1.1 and functionality by NMR over 95%. bromination and azidation reaction of hydroxy terminated PS was carried out in a similar way as described in Step 2 and Step 3. The yield of the alkyl azide terminated PS was over 95% with Mn=~5K and PDI=<1.1 and functionality by NMR over 95%.

Example 6 (Ex 6). Synthesis of Terpyridine, Triazine, Terminated Polystyrene The typical procedure for the synthesis pyridine, triazine terminated polystyrene (Scheme-2) are described here:

Scheme-3. Synthesis of bypyridine, terpyridine and triazine terminated polystyrene.

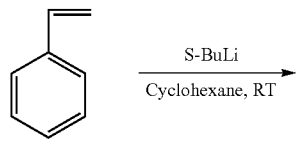

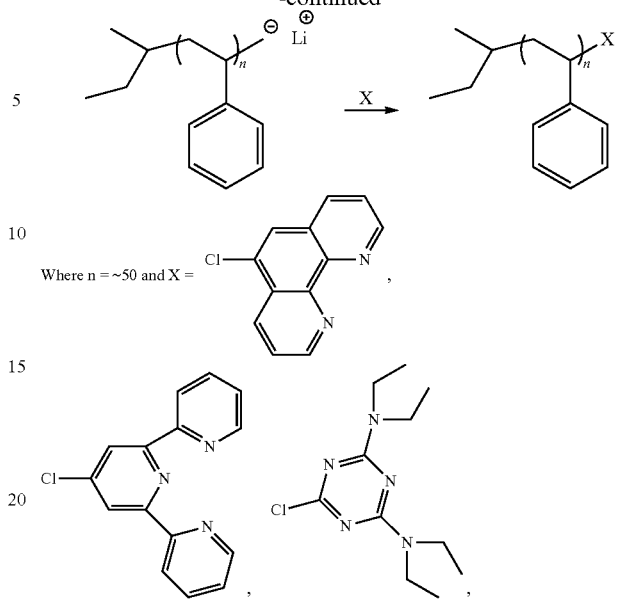

~55 mL of Styrene (column passed and degassed) was taken into a 1 L round bottom flusk with magnetic stirrer with two Rota flow stopcocks and 19F connecting glass joint. 500 mL of anhydrous cyclohexane was then added to the reactor via cannula transfer. 7.9 mL of s-BuLi (1.4M) s-BuLi was added to the reactor using dry glass syringe and continue the reaction for 30 minutes at room temperature. After 30 minutes 5 g of 5-Chloro-1,10-phenanthroline or 4'-Chloro-2,2':6',2"-terpyridine or diethylchlorotriazine was added to terminate the living polymer. The resulted polymer solution was then precipitated in 4 L of IPA, filtered and dry for characterization. The yield of the polymer for all cases were over 90% with Mn=~5K and PDI=<1.1 and functionality by NMR over 95%.

Example 7 (Ex 7): Synthesis of Block Copolymer of Styrene and Methyl Methacrylate (PS-b-PMMA)(PS/PMMA:50/50)

PS-b-PMMA (PS/PMMA: 50/50) polymers was synthesized via sequential living anionic polymerization of styrene (S) and methyl methacrylate (IMA) in tetrahydrofuran (THF) as a solvent using see-butyllithium (1.4 M, Aldrich) as an initiator. The reaction was performed at −78° C. in the presence of LiCl (high purity, Aldrich) under purified argon environment. The feed ratio of monomers was used to obtain a 50/50 mole ratio polymer using 0.142 mole % of initiator versus total moles of monomer. The molecular weight in a PS-b-PMMA were characterized by size-exclusion chromatography (SEC). The number-averaged molecular weight ($M_n$) of BCP was 56,568 g/mole with a PDI of 1.02. The PS mole % determined by 1H NMR was 50.45%. Wafers coated with the inventive composition Example 1 were coated with a 0.02 μm PTFE filtered 1 wt % solution in PGMEA. Then this PS-b-PMMA diblock copolymer was coated on top of grafted film to obtain fingerprint pattern which is shown in FIG. 1.

Example 8 (Ex8): Synthesis of Polystyrene-b-P(4-cyanostyrene)₄ [(PS-b-P(4-CNS)₄)]

Typical synthesis procedure is similar to Example 1. Briefly, 22 mL of styrene (S) was polymerized using 2.8 mL of sec-BuLi (1.4M) initiator. Then 0.9 g of 1,1-diphenylethylene (DPE) was added from the ampule, the deep red color formed immediately indicates the living anion of DPE moiety. After 2 minutes 2.2 mL of 4-cyanostyrene (4-CNS) was added from the ampule. The reaction was continued for 10 minutes then terminated with 2 mL of degassed methanol. The polymer was recovered by precipitation in 500 mL of isopropanol (IPA). Precipitated polymer was filtered and dried in vacuum at 70° C. and gave quantitative yield of polystyrene with 4 units of 4-cyanostyrene at the terminal. The yield of the polystyrene-b-P(4-cyanostyrene)$_4$, (PS-b-P(4-CNS)$_4$) was 98% with Mn=~6K, PDI=1.106 and functionality by NMR is 99%.

Scheme 4

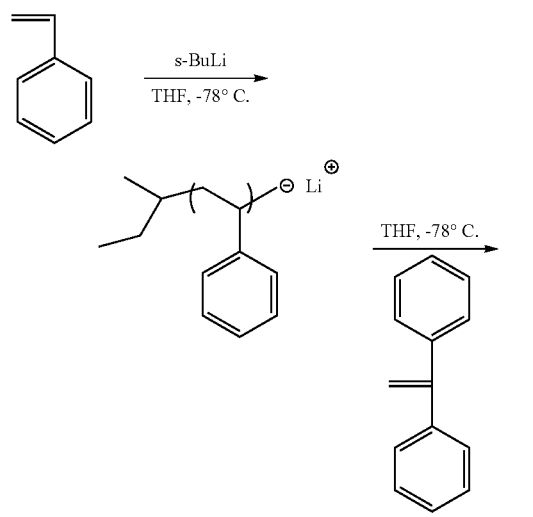

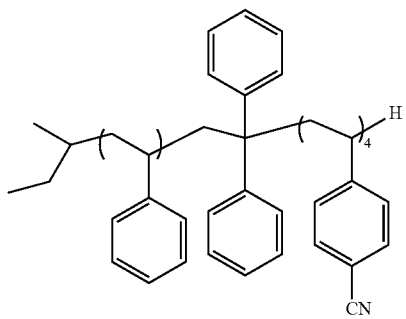

Example 9 (EX 9): Synthesis of P(4-cyanostyrene)$_4$-b-Polymethylmethacrylate [P(4-CNS)$_4$-b-PMMA]

Synthesis procedure is similar to Example 1 (Ex 1). Briefly, 2.2 mL of 4-cyanostyrene was polymerized using the adduct of sec-BuLi (2.8 mL, 1.4M) and 1,1-diphenylethylene (1.2 molar excess with respect to Sec-BuLi) initiator. 32 mL of methyl methacrylate was then added from the ampule and the reaction was continued for 20 minutes at −78° C. The reaction mixture was terminated with 2 mL degassed methanol. The polymer was recovered by precipitation in 1 L of isopropanol (IPA). Precipitated polymer was filtered and dried in vacuum at 70° C. and gave quantitative yield of P(4-cyanostyrene)$_4$-b-Polymethylmethacrylate, P(4-CNS)$_4$-b-PMMA. The yield of the polymer with Mn=~8.4K, PDI=<1.11 and functionality by NMR is 99%.

Scheme 5

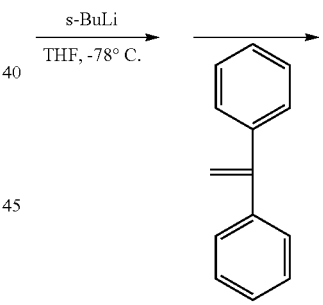

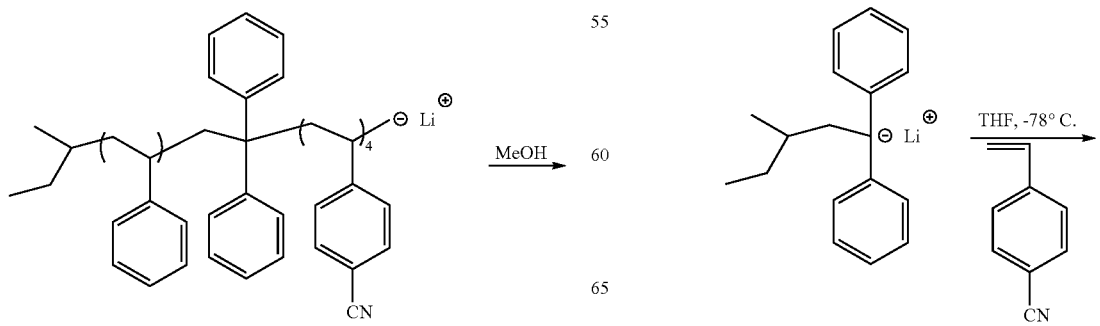

-continued

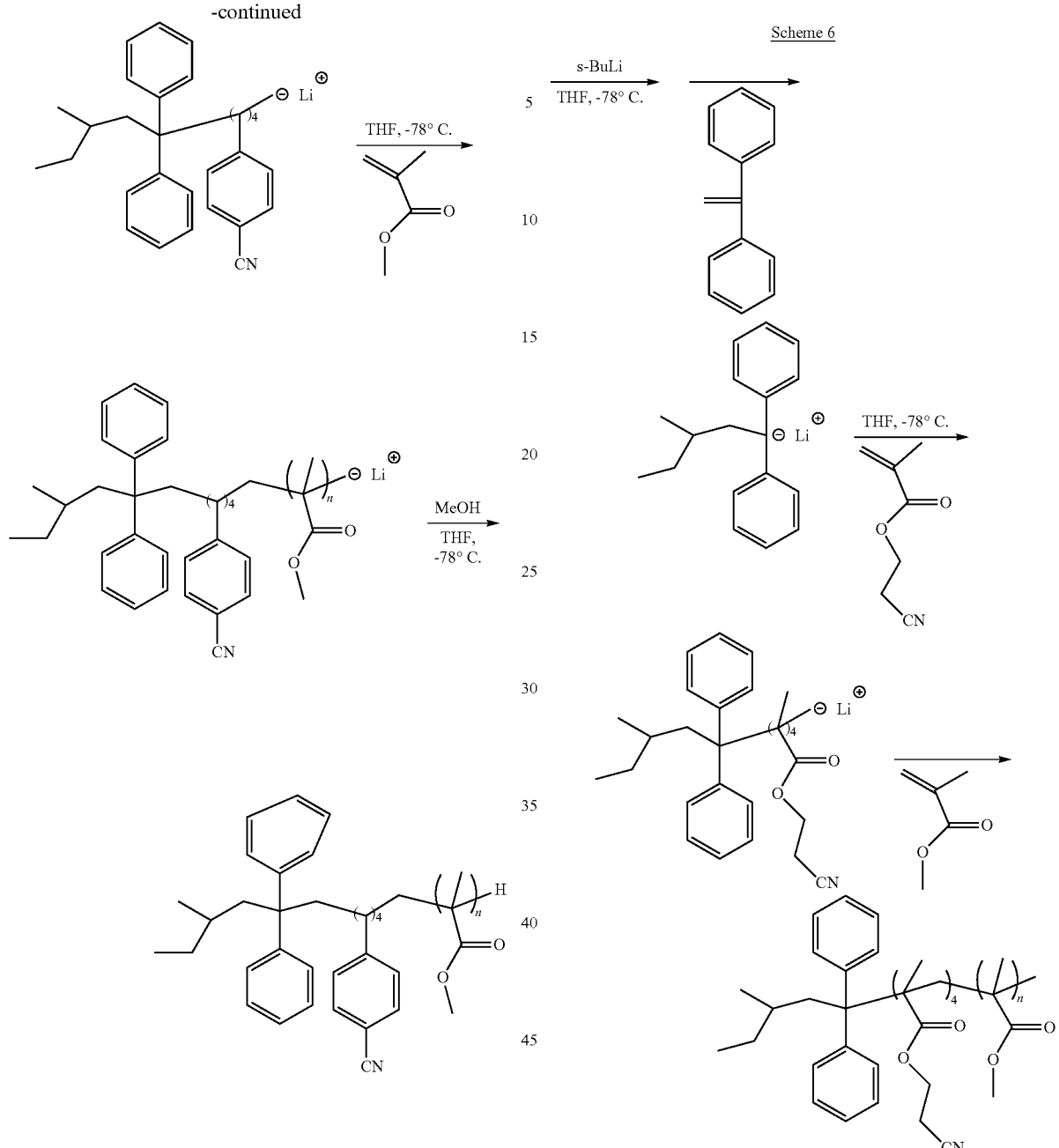

Example 10 (EX 10): Synthesis of P(Cyano methacrylate)$_4$-b-Polymethylmethacrylate Synthesis procedure is similar to Example 1 (Ex 1). Briefly, 2.2 mL of cyano methylmethacrylate was polymerized using the adduct of sec-BuLi (2.8 mL, 1.4M) and 1,1-diphenylethylene (1.2 molar excess with respect to Sec-BuLi) initiator. 32 mL of methyl methacrylate was then added from the ampule and the reaction was continued for 20 minutes at −78° C. The reaction mixture was terminated with 2 mL degassed methanol. The polymer was recovered by precipitation in 1 L of isopropanol (IPA). Precipitated polymer was filtered and dried in vacuum at 70° C. and gave quantitative yield of P(cyano methylmethacrylate)$_4$-b-Polymethylmethacrylate, P(CNMMA)$_4$-b-PMMA. The yield of the polymer with Mn=~9.09K, PDI=<1.07 and functionality by NMR is 99%.

Preparation of and XPS and Contact Angle Testing of Polymer Formulations:
XPS Evaluation of Grafting on Tungsten.

The polymers described here were separately dissolved in PGMEA to form 1 wt % solutions. These solutions were individually filtered using a Nylon filter (Entegris, Billerica, Ma). These solutions were separately coated at 1500 rpm on both metal (Cu, W) and SiO$_2$ wafers, and the wafers were subsequently each baked at 230° C. for 5 min. Following the bake, the wafers were rinsed with PGMEA for 2 min to remove any un-grafted polymer from the wafer which were then spun dried by spinning "1,500 rpm," followed by baking at 110° C. for 1 min. Then water contact angle (WCA) was measured, the results are shown in Table 1. The XPS analysis of the polymers were also shown that it has selectively capped to metal as shown in Table 2.

Table 1 shows the contact angle on W or SiO2 which have been treated with a 1 wt % solution of either Ex 1 or 2 in PGMEA. This treatment was done by individually spin coating on Tungsten (W) or $SiO_2$ substrates the 1 wt % solution forming a coating, heating this coating at 230° C. for 5 minutes under nitrogen and rinsing for 2 minutes with PGMEA. Table 1 showing a high WCA for W indicated that grafting was selectively done only on W.

Table 2 shows the Atomic % (At %) C 1 s. Table 2 showing a ~83% for W indicated that grafting was selectively done only on W. FIG. 1 shows a self-assembled pattern of a block copolymer coating on a W substrate functionalized with Ex. 1. A formulation was made consisting of 1 wt % of the material of Synthesis Example 1 in PGMEA. This formulation was coated on W and Si coupon wafers at 1500 rpm, and baked at 230° C. for 5 min. These wafers were then rinsed with PGMEA for 2 minutes to remove ungrafted brush materials on surface. These wafers were then coated a lamellar type of block copolymer (BCP) solution Ex 7 coating 35 (Lo=30 nm, film thickness is 30 nm at 1500 rpm) on both W and Si grafted coupon wafer at 1500 rpm and annealed at 250° C. for 30 minutes. The annealed films were then examined by e-beam by using a NanoSEM. fingerprint images were only be seen on the annealed BCP coated W coupon wafer, there were no fingerprint images observed in the annealed BCP films on the Si coupon wafer. FIG. 1 shows the BCP self-assembled fingerprint (FP) e-beam images seen on the coated an annealed W coupon wafer on which was grafted the material of Synthesis Example 1. The field of view for this Figure is 0.5 FOV.

TABLE 1

Contact data of metal selective polymer brushes. Process conditions: 1% in PGMEA, coat at 1500 rpm, $N_2$ dry; bake at 230° C./5 min/N2; rinse with PGMEA, $N_2$ dry; XPS WCA (Water contact angle)

| Sample | Contact Angle on Substrate W | Contact Angle on Substrate SiOx |
| --- | --- | --- |
| WCA of Brush PS-DPE-$N_3$ (Ex 1); AB 230° C. | 89 | 69 |
| WCA of Brush PMMA-DPE-$N_3$ (Ex 2); AB 230° C. | 67 | 58 |
| (PS-b-P(4-CNS)$_4$) (Ex 8), AB 230° C. | 89 | 53 |
| P(4-CNS)$_4$-b-PMMA (Ex 9, AB 230° C.) | 63 | 44 |
| P(CNMMA)$_4$-b-PMMA (Ex 10, AB 230° C.) | 64 | 37 |

TABLE 2

XPS data of metal selective polymer brushes. Process conditions: 1% in PGMEA, coat at 1500 rpm, $N_2$ dry; bake at 230° C./5 min/N2; rinse with PGMEA, $N_2$ dry; XPS

| Samples | At % C 1 s | C/W or C/Si | At % O 1 s | At % W 4 f | At % Si 2 p |
| --- | --- | --- | --- | --- | --- |
| 1. PS-DPE-$N_3$ on W (Ex 1) | 83.07 | 10.24 | 7.73 | 8.11 | |
| 2. PS-DPE-$N_3$ on $SiO_2$ (Ex 1) | 34.97 | 0.81 | 21.31 | | 43.01 |
| 3. PMMA-DPE-$N_3$ on W (Ex 2) | 78.91 | 6.6 | 6.23 | 11.85 | |
| 4. PMMA-DPE-$N_3$ on $SiO_2$ (Ex 2) | 16.37 | 0.37 | 20.95 | | 44.25 |
| .5 PS-$N_3$ on W (Ex 4) | 88.04 | 12.83 | 3.42 | 6.86 | |
| 6. PS-$N_3$ on $SiO_2$ (Ex 4) | 30.79 | 0.65 | 21.66 | | 47.55 |
| 7. PS(CNS)4 on W (Ex 8) | 79.2662 | 8.03 | 6.54 | 9.87 | |
| 8 PS(CNS)4 on SiOx (Ex 8) | 17.306 | 0.318 | 20.67 | | 54.42 |
| 9. P(4-CNS)$_4$-b-PMMA (EX 9.) on W | 51.5 | 3.1 | 7.23 | 16.61 | |
| 10 P(4-CNS)$_4$-b-PMMA (EX 9.) on SiOx | 7.81 | 0.248 | 21.26 | | 31.49 |

The invention claimed is:

1. A functional polymer comprising either acrylic repeat units, styrenic repeat units or a mixture of these having a polydispersity from 1 to about 1.12 comprising at least one reactive moiety selected from the group consisting of a moiety comprising at least one N-coordinative functional group having at least one lone pair of electrons, a moiety comprising a dialkylsilyl group, and a mixture of both groups, wherein said reactive moiety is present in said functional polymer either on a repeat unit, on an end group or on both, and said N-coordinative functional group is either a monodentate N-coordinative functional group, a polydendate N-coordinative group or a mixture thereof, and said monodentate N-coordinative functional group is an azide moiety (—$N_3$), or a cyano moiety (—CN), and said polydendate N-coordinative functional group is either a moiety comprising 2 or 3 monocyclic heteroaryl moieties, wherein each said heteroaryl individually contains 1 to 3 nitrogen hetero atoms, or a polycyclic fused ring heteroaryl moiety containing 2 to 4 nitrogen heteroatoms, where further said functional polymer is selected from the group consisting of a functional polymer having structure (I),

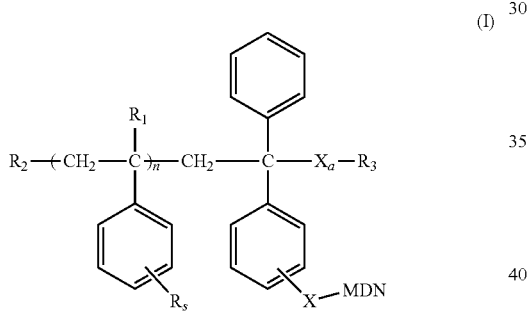

(I)

wherein n is the number of repeating units in the polymer; $R_1$ is H or a C-1 to C-4 linear alkyl; $R_2$ is selected from a C-1 to C-8 linear alkyl, a C-3 to C-8 branched alkyl and a C-3 to C-8 cyclic alkyl; $R_s$ is selected from the group consisting of H, a C-1 to C-8 linear alkyl, a C-3 to C-8 branched alkyl and a C-3 to C-8 cyclic alkyl; $R_3$ is selected from the group consisting of H, a C-1 to C-8 linear alkyl, a C-3 to C-8 branched alkyl and a C-3 to C-8 cyclic alkyl; and a dialkylsilyl moiety [($R_{si}$)($R_{sia}$)SiH—] wherein $R_{si}$ and $R_{sia}$ are independently selected from the group consisting of a C-1 to C-8 linear alkyl, a C-3 to C-8 branched alkyl and a C-3 to C-8 cyclic alkyl; and X and $X_a$ are independently selected from the group consisting of a direct valence bond, a C-1 to C-8 linear alkylene moiety, a C-3 to C-8 branched alkylene moiety, a C-3 to C-8 cyclic alkylene moiety, and a —$X_1$—O—$X_2$— (-alkyleneoxyalkylene-) moiety wherein $X_1$ and $X_2$ are independently selected from the group consisting of a C-1 to C-8 linear alkylene, a C-3 to C-8 branched alkylene and a C-3 to C-8 cyclic alkylene; and MDN is an azide moiety (—$N_3$), or a cyano moiety (—CN), a functional polymer having structure (II),

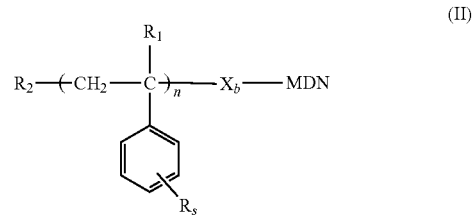

(II)

wherein na is the number of repeating units in the polymer; $R_{1a}$ is H or a C-1 to C-4 linear alkyl; $R_s$ is selected from the group consisting of H, a C-1 to C-8 linear alkyl, a C-3 to C-8 branched alkyl and a C-3 to C-8 cyclic alkyl; $R_{2a}$ is selected from the group consisting of a C-1 to C-8 linear alkyl, a C-3 to C-8 branched alkyl and a C-3 to C-8 cyclic alkyl; $X_b$ is selected from the group consisting of a C-1 to C-8 linear alkylene, a C-3 to C-8 branched alkylene, a C-3 to C-8 cyclic alkylene and a —$X_{1a}$—O—$X_{2a}$— (-alkyleneoxyalkylene-) moiety wherein $X_{1a}$ and $X_{2a}$ are independently selected from the group consisting of a C-1 to C-8 linear alkylene, a C-3 to C-8 branched alkylene and a C-3 to C-8 cyclic alkylene; MDN is an azide moiety (—$N_3$), or a cyano moiety (CN), a functional polymer having structure (III),

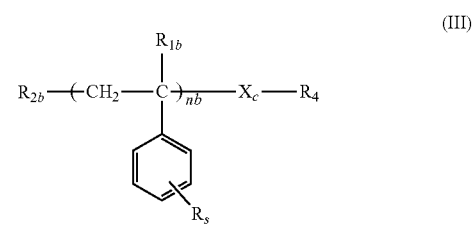

(III)

wherein, nb is the number of repeating units in the polymer; $R_{1b}$ is H or a C-1 to C-4 linear alkyl; $R_s$ is selected from the group consisting of H, a C-1 to C-8 linear alkyl, a C-3 to C-8 branched alkyl and a C-3 to C-8 cyclic alkyl; $R_{2b}$ is selected from the group consisting of a C-1 to C-8 linear alkyl a C-3 to C-8 branched alkyl and a C-3 to C-8 cyclic alkyl; $X_c$ is selected from the group consisting of a direct valence bond, a C-1 to C-8 linear alkylene, a C-3 to C-8 branched alkylene, a C-3 to C-8 cyclic alkylene, and a —$X_{1b}$—O—$X_{2b}$— (-alkyleneoxyalkylene-) moiety wherein $X_{1b}$ and $X_{2b}$ are independently selected from the group consisting of a C-1 to C-8 linear alkylene, a C-3 to C-8 branched alkylene and a C-3 to C-8 cyclic alkylene; $R_4$ is a polydentate N-coordinative functional group having a structure selected from the group consisting of moieties IIIa), (IIIb), (IIIc), (IIId), (IIIe), (IIIf), (IIIg), (IIIh), (IIIi), (IIIj), and (IIIk), wherein * designate the attachment point of these polydentate moieties to structure (III),

(IIIa)

-continued (IIIb) 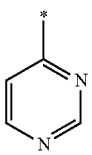

(IIIc), (IIId), (IIIe), (IIIf), (IIIg) 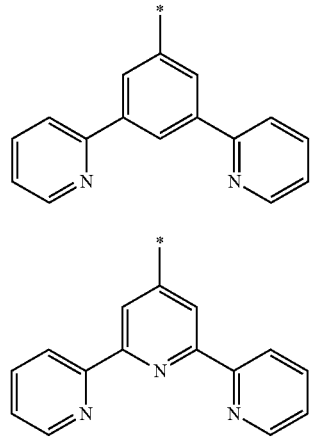

(IIIh) 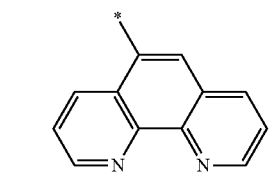

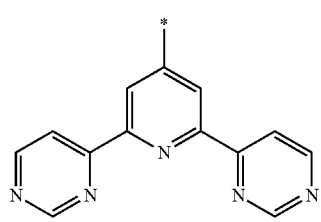

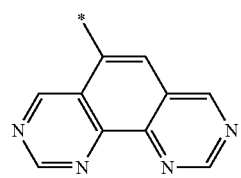

(IIIi) 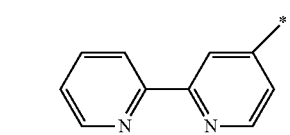

(IIIj) 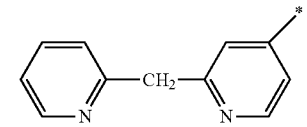

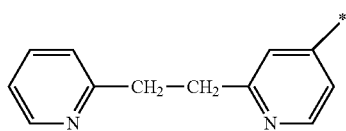

-continued (IIIk) 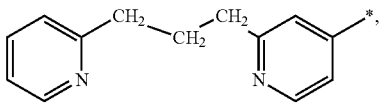

a functional polymer which is a diblock copolymer having structure (IV), (IV)

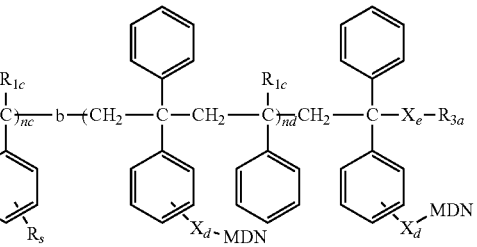

wherein nc is the number of repeating units in a first block and nd is the number of repeat units in a second block; $R_{1c}$ is H or a C-1 to C-4 linear alkyl; $R_s$ is selected from the group consisting of H, a C-1 to C-8 linear alkyl, a C-3 to C-8 branched alkyl and a C-3 to C-8 cyclic alkyl; $R_{2c}$ is selected from the group consisting of a C-1 to C-8 linear alkyl a C-3 to C-8 branched alkyl and a C-3 to C-8 cyclic alkyl; $X_d$ and $X_e$ are independently selected from the group consisting of a direct valence bond, a C-1 to C-8 linear alkylene, a C-3 to C-8 branched alkylene, a C-3 to C-8 cyclic alkylene, and a —$X_{1c}$—O—$X_{2c}$— (-alkyleneoxyalkylene-) moiety wherein $X_{1c}$ and $X_2c$ are independently selected from the group consisting of a C-1 to C-8 linear alkylene, a C-3 to C-8 branched alkylene and a C-3 to C-8 cyclic alkylene; $R_{3a}$ is selected from the group consisting of H, a C-1 to C-8 linear alkyl, a C-3 to C-8 branched alkyl a C-1 to C-8 cyclic alkyl and a dialkylsilyl moiety [$(R_{sib})(R_{sic})$ SiH—] wherein $R_{sib}$ and $R_{sic}$ are independently selected from the group consisting of a C-1 to C-8 linear alkyl, a C-3 to C-8 branched alkyl and a C-3 to C-8 cyclic alkyl; and MDN is an azide moiety (—$N_3$), or cyano moiety (—CN);

a functional polymer which is a diblock having structure (V), (V)

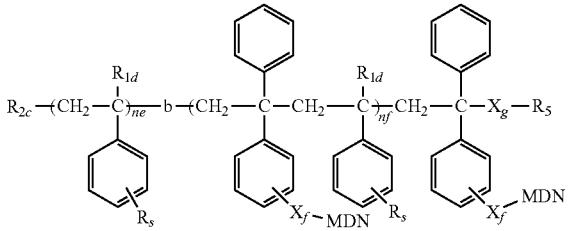

wherein ne is the number of repeating units in a first block and nf is the number of repeat units in a second block; $R_{1d}$ is H or a C-1 to C-4 linear alkyl; $R_s$ is selected from the group consisting of H, a C-1 to C-8 linear alkyl, a C-3 to C-8 branched alkyl and a C-3 to C-8 cyclic alkyl;

$R_{2d}$ is selected from the group consisting of a C-1 to C-8 linear alkyl a C-3 to C-8 branched alkyl and a C-3 to C-8 cyclic alkyl; $X_f$ and $X_g$ are independently selected from the group consisting of a direct valence bond, a C-1 to C-8 linear alkylene, a C-3 to C-8 branched alkylene, a C-3 to C-8 cyclic alkylene, and a —$X_{1d}$—O—$X_{2d}$— (-alkyleneoxyalkylene-) moiety wherein $X_{1d}$ and $X_{2d}$ are independently selected from the group consisting of a C-1 to C-8 linear alkylene, a C-3 to C-8 branched alkylene, and a C-3 to C-8 cyclic alkylene; $R_5$ is a polydentate N-coordinative functional having a structure selected from the group consisting of moieties (IIIa), (IIIb), (IIIc), (IIId), (IIIe), (IIIf), (IIIg), (IIIh), (IIIi), (IIIj), and (IIIk), wherein * designate the attachment point of these polydentate moieties to structure (V); and MDN is an azide moiety (—$N_3$), or a cyano moiety (—CN),

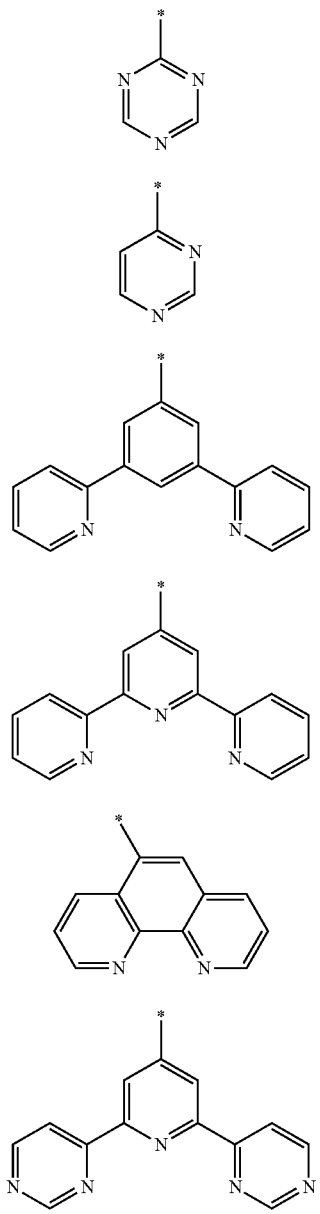

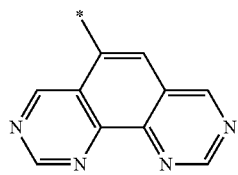

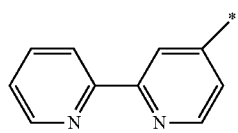

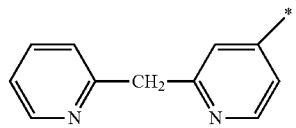

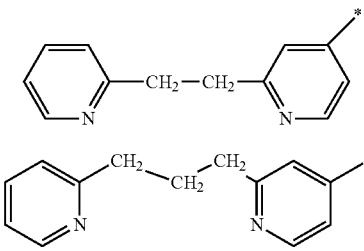

and a functional polymer having structure (VIII),

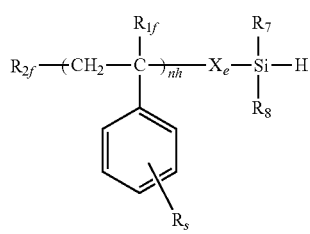

where, nh is the number of repeating units in the polymer; $R_{1f}$ is H or a C-1 to C-4 linear alkyl; $R_s$ is selected from the group consisting of H, a C-1 to C-8 linear alkyl, a C-3 to C-8 branched alkyl and a C-3 to C-8 cyclic alkyl; $R_{2f}$ is selected from the group consisting of a C-1 to C-8 linear alkyl a C-3 to C-8 branched alkyl and a C-3 to C-8 cyclic alkyl; $X_e$ is selected from the group consisting of a C-1 to C-8 linear alkylene, a C-3 to C-8 branched alkylene, a C-3 to C-8 cyclic alkylene, and a —$X_{1f}$—O—$X_{2f}$— (-alkyleneoxyalkylene-) moiety wherein $X_{1f}$ and $X_{2f}$ are independently selected from the group consisting of a C-1 to C-8 linear alkylene, a C-3 to C-8 branched alkylene and a C-3 to C-8 cyclic alkylene; $R_7$ and $R_8$ are independently selected from the group consisting of a C-1 to C-8 linear alkyl, a C-3 to C-8 branched alkyl and a C-3 to C-8 cyclic alkyl.

2. The functional polymer of claim 1 comprising styrenic repeat units.

3. The functional polymer of claim 1 comprising acrylic repeat units.

4. The functional polymer of claim 1 comprising a mixture of acrylic and styrenic repeat units.

5. The functional polymer of claim 1, wherein said reactive moiety is said polydentate N-coordinative functional group.

6. The functional polymer of claim 1, wherein said reactive moiety is a mixture of said monodentate and polydentate N-coordinative functional groups.

7. The functional polymer of claim 1 having structure (I); wherein n is the number of repeating units in the polymer;
$R_1$ is H or a C-1 to C-4 linear alkyl;
$R_2$ is selected from the group consisting of
  a C-1 to C-8 linear alkyl,
  a C-3 to C-8 branched alkyl and
  a C-3 to C-8 cyclic alkyl;
$R_s$ is selected from the group consisting of
  H,
  a C-1 to C-8 linear alkyl,
  a C-3 to C-8 branched alkyl and
  a C-3 to C-8 cyclic alkyl;
$R_3$ is selected from the group consisting of
  H,
  a C-1 to C-8 linear alkyl,
  a C-3 to C-8 branched alkyl and
  a C-3 to C-8 cyclic alkyl; and
  a dialkylsilyl moiety [$(R_{si})(R_{sia})$ SiH—] wherein $R_{si}$ and $R_{sia}$ are independently selected from the group consisting of
    a C-1 to C-8 linear alkyl,
    a C-3 to C-8 branched alkyl and
    a C-3 to C-8 cyclic alkyl; and
X and $X_a$ are independently selected from
  a direct valence bond,
  a C-1 to C-8 linear alkylene moiety,
  a C-3 to C-8 branched alkylene moiety,
  a C-3 to C-8 cyclic alkylene moiety, and
  a —$X_1$—O—$X_2$— (-alkyleneoxyalkylene-) moiety wherein $X_1$ and $X_2$ are independently selected from the group consisting of
    a C-1 to C-8 linear alkylene,
    a C-3 to C-8 branched alkylene and
    a C-3 to C-8 cyclic alkylene; and
MDN is an azide moiety (—$N_3$), or a cyano moiety (—CN);

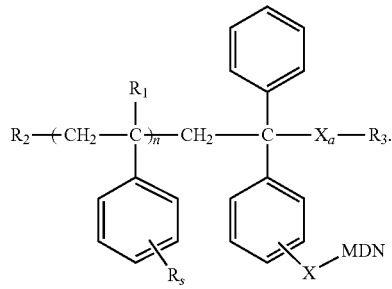
(I)

8. The functional polymer of claim 1 having structure (II); wherein na is the number of repeating units in the polymer;
$R_{1a}$ is H or a C-1 to C-4 linear alkyl;
$R_s$ is selected from the group consisting of
  H,
  a C-1 to C-8 linear alkyl,
  a C-3 to C-8 branched alkyl and
  a C-3 to C-8 cyclic alkyl;

$R_{2a}$ is selected from the group consisting of
  a C-1 to C-8 linear alkyl,
  a C-3 to C-8 branched alkyl and
  a C-3 to C-8 cyclic alkyl;
$X_b$ is selected from the group consisting of
  a C-1 to C-8 linear alkylene,
  a C-3 to C-8 branched alkylene,
  a C-3 to C-8 cyclic alkylene and
  a —$X_{1a}$—O—$X_{2a}$— (-alkyleneoxyalkylene-) moiety wherein $X_{1a}$ and $X_{2a}$ are independently selected from the group consisting of a C-1 to C-8 linear alkylene, a C-3 to C-8 branched alkylene and a C-3 to C-8 cyclic alkylene
MDN is an azide moiety (—$N_3$), or a cyano moiety (—CN);

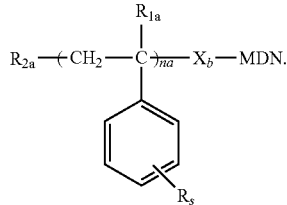
(II)

9. The functional polymer of claim 1 having structure (III); wherein, nb is the number of repeating units in the polymer;
$R_{1b}$ is H or a C-1 to C-4 linear alkyl;
$R_s$ is selected from the group consisting of
  H,
  a C-1 to C-8 linear alkyl,
  a C-3 to C-8 branched alkyl and
  a C-3 to C-8 cyclic alkyl;
$R_{2b}$ is selected from the group consisting of
  a C-1 to C-8 linear alkyl
  a C-3 to C-8 branched alkyl and
  a C-3 to C-8 cyclic alkyl;
$X_c$ is selected from the group consisting of
  a direct valence bond,
  a C-1 to C-8 linear alkylene,
  a C-3 to C-8 branched alkylene,
  a C-3 to C-8 cyclic alkylene, and
  a —$X_{1b}$—O—$X_{2b}$— (-alkyleneoxyalkylene-) moiety wherein $X_{1b}$ and $X_{2b}$ are independently selected from the group consisting of
    a C-1 to C-8 linear alkylene,
    a C-3 to C-8 branched alkylene and
    a C-3 to C-8 cyclic alkylene;
$R_4$ is a polydentate N-coordinative functional group having a structure selected from the group consisting of moieties (IIa), (IIIb), (IIIc), (IIId), (IIIe), (IIIf), (IIIg), (IIIh), (IIIi), (IIIj), and (IIIk), wherein * designate the attachment point of these polydentate moieties to structure (III);

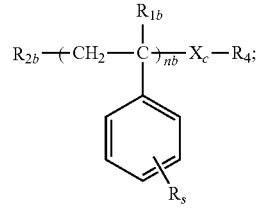
(III)

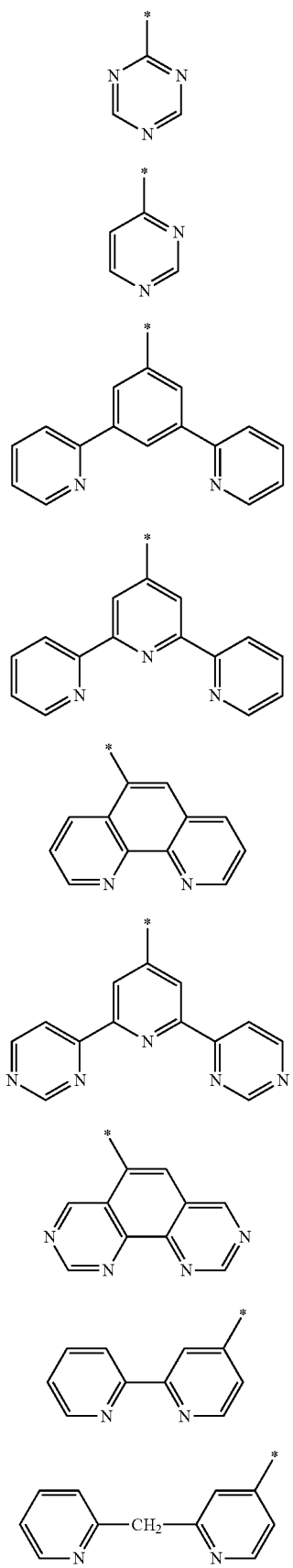

10. The functional polymer of claim 1 which is a diblock copolymer having structure (IV); wherein
nc is the number of repeating units in a first block and nd is the number of repeat units in a second block;
$R_{1c}$ is H or a C-1 to C-4 linear alkyl;
$R_s$ is selected from the group consisting of
H,
a C-1 to C-8 linear alkyl,
a C-3 to C-8 branched alkyl and
a C-3 to C-8 cyclic alkyl;
$R_{2c}$ is selected from the group consisting of
a C-1 to C-8 linear alkyl
a C-3 to C-8 branched alkyl and
a C-3 to C-8 cyclic alkyl;
$X_d$ and $X_e$ are independently selected from the group consisting of
a direct valence bond,
a C-1 to C-8 linear alkylene,
a C-3 to C-8 branched alkylene,
a C-3 to C-8 cyclic alkylene, and
a —$X_{1c}$—O—$X_{2c}$— (-alkyleneoxyalkylene-) moiety wherein $X_{1c}$ and $X_{2c}$ are independently selected from the group consisting of
a C-1 to C-8 linear alkylene,
a C-3 to C-8 branched alkylene and
a C-3 to C-8 cyclic alkylene;
$R_{3a}$ is selected from the group consisting of
H,
a C-1 to C-8 linear alkyl,
a C-3 to C-8 branched alkyl
a C-1 to C-8 cyclic alkyl and
a dialkylsilyl moiety [($R_{sib}$)($R_{sic}$) SiH—] wherein $R_{sib}$ and $R_{sic}$ are independently selected from the group consisting of
a C-1 to C-8 linear alkyl,
a C-3 to C-8 branched alkyl and
a C-3 to C-8 cyclic alkyl; and
MDN is an azide moiety (—$N_3$), or a cyano moiety (—CN);

11. The functional polymer of claim 1 which is a diblock copolymer having structure (V); wherein ne is the number of repeating units in a first block and nf is the number of repeat units in a second block;

$R_{1d}$ is H or a C-1 to C-4 linear alkyl;

$R_s$ is selected from the group consisting of
   H,
   a C-1 to C-8 linear alkyl,
   a C-3 to C-8 branched alkyl and
   a C-3 to C-8 cyclic alkyl;

$R_{2d}$ is selected from the group consisting of
   a C-1 to C-8 linear alkyl
   a C-3 to C-8 branched alkyl and
   a C-3 to C-8 cyclic alkyl;

$X_f$ and $X_g$ are independently selected from the group consisting of
   a direct valence bond,
   a C-1 to C-8 linear alkylene,
   a C-3 to C-8 branched alkylene,
   a C-3 to C-8 cyclic alkylene, and
   a —$X_{1d}$—O—$X_{2d}$— (-alkyleneoxyalkylene-) moiety wherein $X_{1d}$ and $X_{2d}$ are independently selected from the group consisting of
      a C-1 to C-8 linear alkylene,
      a C-3 to C-8 branched alkylene, and
      a C-3 to C-8 cyclic alkylene;

$R_5$ is a polydentate N-coordinative functional group having a structure selected from the group consisting of moieties (IIIa), (IIIb), (IIIc), (IIId), (IIIe), (IIIf), (IIIg), (IIIh), (IIIi), (IIIj), and (IIIk), wherein * designate the attachment point of these polydentate moieties to structure (V); and MDN is an azide moiety (—$N_3$), or a cyano moiety (—CN);

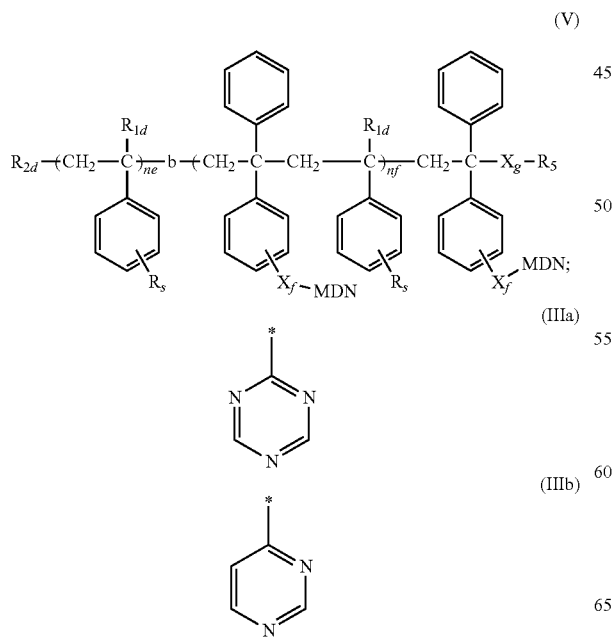
(V)

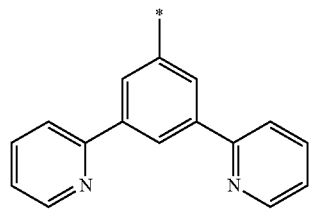
(IIIc)

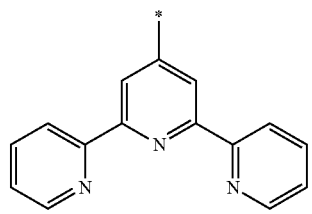
(IIId)

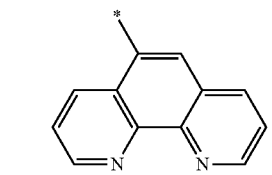
(IIIe)

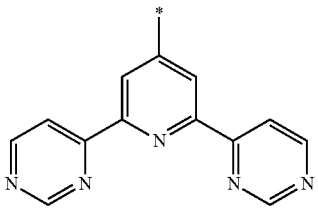
(IIIf)

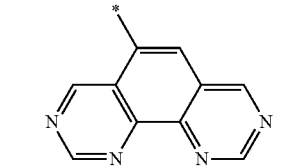
(IIIg)

(IIIa)

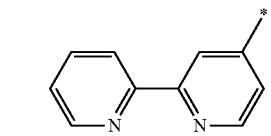
(IIIh)

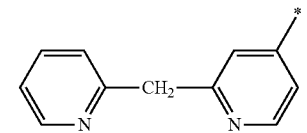
(IIIi)

(IIIb)

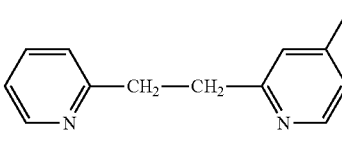
(IIIj)

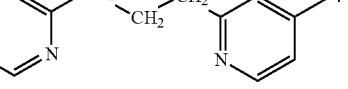
(IIIk)

12. The functional polymer of claim 1 having structure (VIII), where,
nh is the number of repeating units in the polymer;
$R_{1f}$ is H or a C-1 to C-4 linear alkyl;
$R_s$ is selected from the group consisting of
H,
a C-1 to C-8 linear alkyl,
a C-3 to C-8 branched alkyl and
a C-3 to C-8 cyclic alkyl;
$R_{2f}$ is selected from the group consisting of
a C-1 to C-8 linear alkyl
a C-3 to C-8 branched alkyl and
a C-3 to C-8 cyclic alkyl;
$X_e$ is selected from the group consisting of
a C-1 to C-8 linear alkylene,
a C-3 to C-8 branched alkylene,
a C-3 to C-8 cyclic alkylene, and
a —$X_{1f}$—O—$X_{2f}$— (-alkyleneoxyalkylene-) moiety wherein $X_{1f}$ and $X_{2f}$ are independently selected from the group consisting of
a C-1 to C-8 linear alkylene,
a C-3 to C-8 branched alkylene and
a C-3 to C-8 cyclic alkylene;
$R_7$ and $R_8$ are independently selected from the group consisting of
a C-1 to C-8 linear alkyl,
a C-3 to C-8 branched alkyl and
a C-3 to C-8 cyclic alkyl;

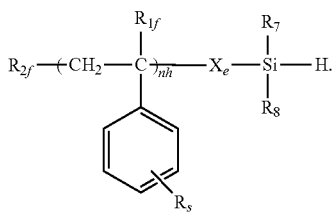

(VIII)

13. A composition comprising the functional polymer of claim 1, and a spin casting solvent.

14. A process of coating a pinning layer comprising the step of
i) coating the compositions of claim 13 on a substrate which contains only metallic surfaces or which contains a mixture of metallic and non-metallic surfaces.

15. The process of claim 14 wherein said substrate is one which contains both metallic and non-metallic surfaces selected from the group consisting of
a substrate having metallic surfaces and Si surfaces,
a substrate having metallic surfaces and GaAs surfaces,
a substrate having metallic surfaces and Ge surfaces,
a substrate having metallic surfaces and silicon oxide surfaces,
a substrate having metallic surfaces and silicon nitride surfaces,
a substrate having metallic surfaces and silicon oxynitride surfaces,
a substrate having metallic surfaces and neutral layer surfaces,
a substrate having metallic surfaces and photoresist surfaces, and
a substrate having metallic surfaces and spin-on carbon surfaces.

16. The process of claim 14 wherein the process comprises additional steps (ii) and (iii):
ii) baking said coating to form a baked coating,
iii) rinsing said baked coating; with an organic solvent, leaving a brush film attached to the metallic surfaces.

17. The process of claim 14, wherein said non-metallic surfaces are Si surfaces, $SiO_2$ surfaces or a mixture of these two types of surfaces.

18. The process of claim 14, wherein said metallic surfaces are surfaces which are selected from at least one of Cu, W, Mo, Al, Zr, Ti, Hf, Ag and Au surfaces.

19. A process of forming a patterned substrate by directed self-assembly comprising steps i)-vi),
i) coating the composition of claim 13 on a substrate containing both metallic surfaces and non-metallic neutral layer surfaces,
ii) baking said coating to form a baked coating,
iii) rinsing said baked coating, leaving a brush layer only attached to said metallic surfaces, forming a patterned pinning layer,
iv) coating a block copolymer layer on top of said patterned pinning layer,
v) forming a directed self-assembly film of the block copolymer layer, and
vi) etching said directed self-assembled block copolymer forming a pattern in said substrate.

* * * * *